(12) United States Patent
Leitel et al.

(10) Patent No.: US 9,211,879 B2
(45) Date of Patent: Dec. 15, 2015

(54) DEVICE AND METHOD FOR A RAIL VEHICLE

(75) Inventors: Holger Leitel, Pullach (DE); Victor Behrends, Neuried (DE); Kurt Genseleiter, Grasbrunn (DE); Rolf-Stefan Scheible, Hamburg (DE)

(73) Assignee: Eureka Navigation Solutions AG, Munich (DE)

( * ) Notice: Subject to any disclaimer, the term of this patent is extended or adjusted under 35 U.S.C. 154(b) by 500 days.

(21) Appl. No.: 13/130,147

(22) PCT Filed: Nov. 18, 2009

(86) PCT No.: PCT/EP2009/008211
§ 371 (c)(1),
(2), (4) Date: May 19, 2011

(87) PCT Pub. No.: WO2010/057623
PCT Pub. Date: May 27, 2010

(65) Prior Publication Data
US 2011/0231039 A1  Sep. 22, 2011

(30) Foreign Application Priority Data

Nov. 19, 2008  (DE) .................. 10 2008 057 966
May 8, 2009   (DE) .................. 10 2009 020 428

(51) Int. Cl.
| | |
|---|---|
| *G01M 17/08* | (2006.01) |
| *B60B 35/00* | (2006.01) |
| *B61L 25/02* | (2006.01) |
| *F16D 66/02* | (2006.01) |
| *B23P 11/00* | (2006.01) |
| *G01P 1/00* | (2006.01) |
| *G01H 17/00* | (2006.01) |
| *B60T 17/22* | (2006.01) |

(Continued)

(52) U.S. Cl.
CPC ............. *B60T 17/228* (2013.01); *B60T 8/1893* (2013.01); *B60T 8/329* (2013.01); *B60T 8/3235* (2013.01); *B61L 15/0081* (2013.01); *B61L 25/021* (2013.01); *B61L 25/026* (2013.01); *G01P 3/22* (2013.01); *Y10T 29/49826* (2015.01)

(58) Field of Classification Search
CPC ... B60T 17/228; B61L 15/0081; B61L 15/02; B61L 15/0072; B61L 25/021; B61L 25/02; B61L 25/04; B61L 25/041; B61L 25/043; B61L 25/045; B61L 25/046; B61L 25/048; B61K 9/00; B61K 9/12; B61K 13/00; B61K 27/0077; G01D 3/08
USPC ....... 701/19; 246/122 R, 169 R; 73/649, 493; 188/1.11 R; 29/428; 295/36.1
See application file for complete search history.

(56) References Cited

U.S. PATENT DOCUMENTS

| | | |
|---|---|---|
| 2,024,669 A | 12/1935 | Tarisien |
| 6,006,868 A | 12/1999 | Klink |

(Continued)

FOREIGN PATENT DOCUMENTS

| | | |
|---|---|---|
| CN | 1818568 A | 8/2006 |
| CN | 2858734 Y | 1/2007 |

(Continued)

*Primary Examiner* — Mussa A Shaawat
*Assistant Examiner* — Kyung Kim
(74) *Attorney, Agent, or Firm* — McNees Wallace & Nurick LLC

(57) ABSTRACT

The invention relates to devices and methods, which relate to the arrangement of a sensor on the shaft of a rail vehicle.

6 Claims, 21 Drawing Sheets

(51) Int. Cl.
  *B60T 8/18*    (2006.01)
  *B60T 8/32*    (2006.01)
  *B61L 15/00*   (2006.01)
  *G01P 3/22*    (2006.01)

(56) References Cited

U.S. PATENT DOCUMENTS

| | | | |
|---|---|---|---|
| 6,522,127 B1 * | 2/2003 | De Fleury et al. | ....... 324/207.16 |
| 2004/0083811 A1 | 5/2004 | Kranz | |
| 2006/0290478 A1 | 12/2006 | Stull et al. | |
| 2007/0152107 A1 | 7/2007 | LeFebvre et al. | |

FOREIGN PATENT DOCUMENTS

| | | |
|---|---|---|
| DE | 101 07 571 A1 | 5/2002 |
| DE | 102006005206 B3 | 9/2007 |
| EP | 0 391 047 A1 | 10/1990 |
| EP | 0 976 638 A1 | 2/2000 |
| EP | 0976638 A1 | 2/2000 |
| EP | 1 013 533 A1 | 6/2000 |
| EP | 1 197 419 A1 | 4/2002 |
| EP | 1384638 A2 | 1/2004 |
| EP | 1465358 A2 | 10/2004 |
| FR | 1 076 317 A | 10/1954 |
| WO | 2004022406 A1 | 3/2004 |
| WO | 2005105536 A1 | 11/2005 |

* cited by examiner

DEVICE AND METHOD FOR A RAIL VEHICLE

BACKGROUND OF THE INVENTION

The present invention relates to devices and methods for measuring and/or testing devices for rail vehicles.

Generally, rail vehicles offer numerous possibilities of attaching measuring or testing devices to them. Almost all of these possibilities require an elaborate adaptation of the attachment mechanisms with different rail vehicle types. In addition, many measuring and testing devices require an access as unimpeded as possible to the or into the rail vehicle and away from the rail vehicle or out of it, for example to transmit data via radio. Generally, measuring and/or testing devices are therefore attached in an upper outer region of the rail vehicle, however, which is associated with great difficulties due to very different and optionally varying superstructures on the rail vehicle. Certain possibilities of attachment, for example to the chassis, only come into consideration with additional safety tests, which makes these attachment mechanisms expensive and unattractive.

Accordingly, there is a need and a desire to provide devices and methods for rail vehicles, which allow a universal and simple coupling to the rail vehicle with optimum procedure of an attached device in operation.

SUMMARY OF THE INVENTION

According to an aspect of the invention, a device is configured such that it can be coupled to the shaft of a vehicle axle of a rail vehicle. Advantageously, the coupling can be effected by winding around the shaft. According to the invention, it has been recognized that the arrangement on a shaft of a rail vehicle offers particular advantages. Among other things, the shaft of rail vehicles belongs to the few components of a rail vehicle, which allows only slight deviations in its construction. Typically, approximately only two diameters are used worldwide. This offers the possibility of disposing devices such as for example sensors, evaluation units etc. on rail vehicles in particularly uncomplicated and simple manner. In particular, retrofit of rail vehicles with such a device is particularly simplified by the arrangement of the shaft of the rail vehicle. A subsequent safety test can be omitted. For nearly all of the measuring and testing procedures, which are to be effected on a rail vehicle, the arrangement of corresponding sensors and associated electronics on one or more shafts of the rail vehicle offers amazing advantages. Below, this becomes clear based on the description of numerous aspects of the invention.

The device can be positively coupled to the shaft such that displacement with respect to the shaft does not occur in operation of the rail vehicle. In particular, the device should be coupled to the shaft such that it is entrained with the rotation movement of the shaft upon rotation of the shaft.

For example, the device can be attached to the shaft by means of one (or more) band wound around the shaft. Therein, a side of the device and/or of the attachment band facing the shaft can have knobs. The side facing the shaft can also be configured in the manner of a tire profile. Hereby, a contact surface with the shaft as small as possible results. The profile or the knobs can be configured to promote the drain of liquid from the shaft. This all can reduce corrosion on the shaft, which can represent a critical aspect in this type of attachment.

Advantageously, the device can be coupled to the shaft such that notch effect does not occur on the shaft. The device can be coupled to the shaft such that a varnish layer applied to the shaft is not damaged. In this respect, the force action, with which the device is coupled to the shaft, is to be adjusted such that it does not become too great. The device or the attachment means (e.g. the band) can have a material that is softer than a varnish layer on the shaft. The device or the attachment means (e.g. the band) can have a material that is softer than a steel of the shaft.

Advantageously, the device can be disposed on the shaft such that it is not disposed in the center of the shaft. A slight displacement in axial direction of the shaft out of the center of the shaft or out of the center of the rail vehicle can offer advantages in particular for mechanical reasons. In addition, a line of sight to the transport container or the bottom thereof can be achieved for various configurations in this manner. Optionally, more space for the rotation of the device around the shaft can also be provided in this manner. Thereby, the assembly can also be facilitated.

According to an aspect of the present invention, the device can in particular include electronics. The electronics can be configured for acquiring vehicle data or data or information related to the vehicle. Although the arrangement on the shaft of the rail vehicle actually seems to be problematic for the acquisition of numerous data, some particularly advantageous possibilities of application have become apparent.

The invention also provides a device and a method for locating or positioning of a rail vehicle. Thus, the device can be advantageously configured to perform a radio location method. The radio location method can be based on the use of stationary radio reference stations (hot spots). Therein, the device on the shaft of the rail vehicle can be configured to operate within the scope of a wireless radio network.

According to a further aspect of the invention, the device can be configured to perform the radio location method based on a satellite navigation method. In particular, the radio location method can be based on the satellite navigation system Galileo. The radio location method can also use a global positioning system (GPS). To this, a GPS receiver can in particular be disposed on the shaft of a rail vehicle.

Upon disposing a GPS receiver on the shaft of a rail vehicle, in particular reflections by the rail vehicle and shadings are to be considered. Therefore, it can be advantageous to displace the device in axial direction laterally to the edge of the rail vehicle on the shaft.

The invention also provides a device and a method for determining the loading state of a rail vehicle. In an advantageous configuration, the device can have electronics suitable for performing a distance measurement between shaft and rail vehicle bottom. It can then be used to determine the loading state of the rail vehicle. The distance measurement between shaft and rail vehicle bottom can be effected by means of a wireless method, in particular with employment of radio signals. In particular, pulsed radio signals can be employed for distance measurement between shaft and rail vehicle bottom. Advantageously, these pulsed radio signals can be emitted from the device disposed on the shaft. Upon employment of pulsed radio signals, the distance measurement between shaft and rail vehicle bottom can be effected by means of measurement of backscatterings of pulsed radio signals. To this, corresponding detection electronics can advantageously be disposed in the device on the shaft.

In another implementation, an ultrasonic transmitter and an ultrasonic receiver can be provided in the device, by which the propagation time of the sound waves between the axle and a known object on the wagon bottom can be measured. Therein, it can be helpful to perform the measurement only if the acceleration sensor incorporated in the device has detected that the ultrasonic sensors are located at a certain angle of rotation, advantageously the top vertex of the shaft.

The invention also provides a device and a method for determining the mass of a rail vehicle. To this, advantageously, an output signal of an acceleration sensor can be evaluated, which is disposed on a shaft of the rail vehicle. The mass of a freight wagon can be determined in that it vibrates in a manner typical to the mass (frequency, amplitude) after impact (switching impact, running over a switch). The impact can be determined in direction and intensity by the acceleration sensor on the shaft (axle), the vibration can be determined by the same acceleration sensor or by a further sensor on the chassis. From this measurement data, the mass of the wagon and the mass of the load with known empty weight and thereby the loading state can be determined. The vibrations generated by the impact in the axle can also be determined by a suitable structure-borne sound sensor accommodated in the housing of the device. In this respect too, the arrangement on the axle is to be preferred to an arrangement on the vehicle or on a hub or wheels.

The invention also provides a method for statistical acquisition of the traveling state "brake applied" in connection with a velocity reduction for determining the brake wear. Therein, at least one signal of a sensor attached to a shaft or several shafts of a rail vehicle is evaluated. Then, the acceleration or the velocity of the rail vehicle is derived from the sensor signal. It is then compared to the state of the brake (applied or not) and therefrom it is derived, from where the velocity variation originates. From this, the wear of the brake can also be derived. The evaluation is correspondingly configured for determining the wear of the brake based on the sensor signals (for example of the acceleration sensor) and the activation state of the brake. The evaluation can occur in the device on the shaft of the rail vehicle. This evaluation can also be only a partial evaluation, which for example manifests itself only in an error code, if the brake is actuated, for example although the train is still accelerating or is not correspondingly decelerating its travel. The arrangement on the shaft of the rail vehicle is particularly advantageous for these measurements.

In a further advantageous configuration, the device can in particular be configured to detect braking of the rail vehicle. To this, the device can advantageously include a structure-borne sound sensor with a coupling to the shaft (axle). The frequency and duration of braking operations is a crucial measure of the wearout and thereby of the service requirement of the vehicle. By the fixed positive connection of the wheel discs to the axle, a good acoustic transmission is effected between them. The acoustic coupling of the sensor, located on the side of the device facing the shaft, to the shaft is effected via an intermediate piece allowing good transmission of the structure-borne sound, but does not damage the varnish layer on the shaft. The application of the brakes generates a significant variation of the structure-borne sound by the high friction in the wheel discs, which can be measured with the sensor. The use of a measurement frequency between a few Hertz and 2000 Hz is advantageous. The evaluation electronics can perform a corresponding calibration of the two states "brake released" and "brake applied" using an additional velocity signal. Therein, the acoustic profile of vehicle acceleration with released brake is statistically acquired and used for the comparison. A further improvement of the statistical acquisition of the brake wearout is the incorporation of the braking energy, which can be determined with an acceleration sensor on the shaft. The intensity of braking can be determined via the reduction of the velocity (or deceleration) determined thereby during the traveling state "brake applied" and can be stored for later evaluation of wear. The arrangement on the shaft of the rail vehicle is particularly advantageous because disturbing side noise influences and attenuations are low here.

The device can also advantageously include a temperature sensor. This temperature sensor can generally be employed to detect the ambient temperature. Advantageously, the temperature measurement can also be used for determining overheating of the axle bearings of the rail vehicle. In particular, the temperature can be determined by means of an infrared sensor. A corresponding infrared sensor can then advantageously also be disposed in the device on the shaft. The arrangement of a (two) temperature sensor(s), in particular of an infrared sensor, within the device with line of sight to the wheel inner side, can advantageously be used to detect so-called hot boxes, since the bearing is exactly on the other side of the wheel. Here too, the arrangement on the shaft proves to be particularly advantageous.

In a further advantageous configuration, a device advantageously disposed on the shaft of a rail vehicle can be further configured to perform positioning of the rail vehicle according to a location filtering method. The location filtering method can be based on the comparison of previously georeferenced recorded local patterns of measured quantities and/or signatures ascertainable by the device. In particular, it can be based on the georeferenced acquisition and storage of acceleration values (impacts by rail and running over switches, changes of direction in switches, changes of direction by bends, vertical changes of direction in grade and downgrade sections, recurring path, acceleration, velocity profiles, e.g. deceleration in the passage through rail stations, recurring idle times) as well as electromagnetic waves. To this, the device can advantageously have radio receivers and corresponding antennas, with which electromagnetic waves of different frequency ranges can be received. The patterns of acceleration values and electromagnetic waves thus detected can be associated with certain track sections. By comparison to prior georeferenced records, in this manner, localization or positioning of the rail vehicle can also be effected without satellite navigation. The device can be configured to receive electromagnetic waves in a frequency range below 100 MHz and determine local patterns therefrom. The device can be configured to receive electromagnetic waves in a frequency range below 1 MHz and determine local patterns therefrom. The device can be configured to receive electromagnetic waves in a frequency range above 100 MHz and below 900 MHz and determine local patterns therefrom. The device can be configured to receive electromagnetic waves in a frequency range above 2.4 GHz and determine local patterns therefrom. The positioning can advantageously be a combination of satellite navigation methods and devices and location filtering methods.

The location filtering method can also be based on the detection of bends. To this, in particular the employment of acceleration sensors comes into consideration. Then, an acceleration sensor can be advantageously disposed in the device on the shaft. The location filtering method can also be based on the detection of acceleration values. In particular, certain specific patterns or signatures generated by rolling of the wheels on certain track sections can be evaluated for detecting the position of the rail vehicle.

The location filtering method can also be based on acoustic signals. In particular, the device can then also have an acoustic sensor, such as for example a microphone or a structure-borne sound sensor or the like, on the shaft on a rail vehicle. For example, the acoustic signals can then be used for detecting a braking activity of the rail vehicle. Moreover, track sections, switches, bends etc. can be evaluated by means of acceleration values and/or in acoustic manner. Hereby, a device according to the invention can determine the position or the relative position of the rail vehicle on a track section or forward corresponding data that is used for determining the position or the velocity as well as further vehicle operating parameters outside of the rail vehicle.

According to an advantageous aspect of the invention, the device can also be configured to carry out the location filtering method based on the detection of images. To this, the device can have an image or brightness sensor. It can detect punctiform, linear or plane image information, brightness or coloring or color differences or brightness differences. These detection signals can then also be used for determining the position of the rail vehicle.

For positioning by location filters, advantageously, a small portion of a freight wagon fleet can be equipped with sensors and precise satellite navigation receivers (e.g. GPS, Galileo, EGNOS, AGPS, DGPS). The determined measurement data is linked to the determined position and the time of measurement and locally stored for the later evaluation or communicated to a database via a radio link (e.g. GSM, satellite communication). Thereby, a "map of the location-specific accelerations, radio waves etc." is constructed. The remaining major portion of the freight wagon fleet can then only be equipped with the inexpensive sensors. The precise, expensive satellite navigation receivers are not required herein. By comparison of the recorded measurement data to the "map" recorded in the database, the position is determined. The comparison can be effected in the sensor or in the database system. In order to be able to perform the comparison in the sensor, the relevant data from the database is transmitted to the sensor via radio link (GSM, satellite communication, local radio networks). However, a "digital broadcast" method (e.g. DAB) is particularly advantageous for the transmission of this data, since identical data ("map") is transmitted to many sensors from a center (database) (1:n relation).

With the aid of the below described mileage sensor, it can be precisely calculated on from a position determined in the "map" (coupling method). It has become apparent that location with track precision is possible with this method. This is in particular important in switching operation and in track construction works (triggering a work gang warning).

The low number of the freight wagon fleet equipped with satellite navigation is sufficient to ensure the continuous automatic update of the "map".

According to an aspect of the invention, a device is provided, which is configured to determine the wagon sequence of a rail vehicle. Herein, the relative position of a wagon can be determined by means of the movement of the wagon at a certain point of time. Hereto, advantageously, a movement sensor can be attached to the rail vehicle. Advantageously, the movement sensor can be disposed on a shaft of one and/or more wagons. Advantageously, a movement sensor is located on each wagon of a rail vehicle or of a train. The determination of the movement is then effected by means of the movement sensor. In an advantageous configuration, the movement sensor can be an acceleration sensor disposed on the shaft of the rail vehicle.

According to the prior art, a wagon master has to manually control if the train composition and the sequence of the wagons is correct. The control is time consuming and inconvenient. According to this aspect of the invention, the wagons of a train or rail vehicle are equipped with devices according to the aspect of the invention. In particular, devices are disposed on the shafts of the rail vehicles in inventive manner. In an embodiment, upon starting, each device on a shaft stores the time when it has started. The shaft sends the measured starting time and its actual time of day to adjacent shafts or telematics units for collecting all of the data. The communication of the actual time of day serves for synchronization of the clocks such that the data receiver can very exactly determine the differences in the starting times of the shafts. Due to the high elasticity of the wagon buffers and the today usual hook connections, trains have a considerable resilience in longitudinal direction. Compression of the train in particular occurs in switching and in braking the train by the locomotive. Upon subsequent pulling of the train, thereby, the points of time of the start of movement of each individual wagon are delayed.

According to an aspect of the invention, a method for determining the wagon sequence of a rail vehicle (i.e. of a rail vehicle with a plurality of wagons, thus a train) is provided. Herein, the point of time of a first movement of a wagon of the rail vehicle is evaluated with a point of time of a first movement of another wagon of the rail vehicle for determining the relative position of the two wagons. Advantageously, the movement is a forward or rearward movement of the wagon. It can be determined in that a movement sensor is attached, which determines a movement value, which is filtered and evaluated in order to block out simple vibrations or disturbances. This aspect of the invention is based on the realization that the wagons of a rail vehicle move at different points of time upon starting. Due to resilience of the couplings of the wagons of a rail vehicle, a time delay between the individual wagons occurs upon start. Therefore, among other things, the method according to the invention is based on the principle to determine the movement and the point of time of the movement and to use it for determining the wagon sequence. Herein, the arrangement of sensors on the shafts of the wagons is particularly fault-tolerant and beneficial.

Alternatively to the determination of the train sequence by the beginning of the train movement, it can also be effected during travel by the temporal comparison of the occurrence of an external event (e.g. a switch passage). This aspect of the invention is based on the realization that all of the wagons of a train in motion will pass a location with a special characteristic (e.g. bump) in a finite time. The switch passage is registered by all wagons and provided with a time stamp of the clocks synchronously running in all of the devices. For plausibility check, advantageously, the current velocity of the wagon can be stored in the event. It has to be nearly equal in all of the events of the wagons of the concerned train, since all of the wagons of a train travel with the same velocity. The comparison of the events can be effected in any apparatus within the train or at another location besides the train. A corresponding evaluation box can also be specifically set up at a location, which deliberately triggers such event generation (e.g. switch).

According to an aspect of the invention, the evaluation, that is the comparison of the points of time, can be effected in the device on a shaft of the rail vehicle.

An additional evaluation of the radio signal strengths between the shafts additionally allows plausibility check: thereby, wagons started at the same time in the same rail station on other tracks can be filtered out of the wagon list of a train.

According to another aspect of the invention, the evaluation can also take place in an evaluation unit outside of the rail vehicle.

Advantageously, the evaluation can also take place in a portable apparatus outside of the rail vehicle, which is operated by a person, who is set to control the wagon sequence. The handheld apparatus is then configured to receive and compare the points of time of the beginning of the movement of each wagon. In another configuration, this is effected in one of the devices on a shaft of a wagon.

According to a further aspect, the evaluation of the points of time of the first movement of the wagons can also be effected within a wagon of the rail vehicle, in particular the locomotive or the traction engine. To this, the points of time of the first movement can be transmitted from a sensor on a shaft to the next sensor on the next shaft of a next wagon. In particular, herein, an ad-hoc network can be established between the sensors on the shafts of the wagons of the rail vehicle. Therein, the devices on the shafts of the wagons of the rail vehicle can each transmit the data to the next device on a shaft, which in turn forwards the data until finally a wagon or a position on the train is reached, in which the evaluation can be effected. Therefore, in this respect too, the arrangement of the device on the shaft is particularly advantageous.

Advantageously, the movement can be a rolling movement of the wheels of the rail vehicle. Therefore, in advantageous configurations, sensors can in particular be provided in a device attached to a shaft of the rail vehicle, which are suitable to determine a rotation of the wheels. If the shaft of a vehicle axle, to which the device with the corresponding sensor is attached, rotates in conformity with a rotation of the wheels, the rotation movement of the shaft can be used for detecting a rotation of the wheels and thereby of a relevant movement of the wagon or rail vehicle. In particular, a timer or a real-time clock could then be provided in the device, which indicates the point of time of the start of movement. The start of movement could then be provided with an absolute (real-time clock) or relative (general clocked timer) time stamp. In another embodiment, the point of time can also be obtained from a wireless network by means of a time-based location system (GPS) or an external time reference (timer or real-time clock) in an evaluation unit outside of the device on a shaft. Then, the device on the shaft of the rail vehicle would only signal or communicate the beginning of the movement. Advantageously, an ID (identification number) of the shaft and/or of the wagon can then be linked to the data. An ID of the shaft can for example be provided in a permanent memory (ROM, EEPROM) in the device on the shaft. The ID can then be a unique number, which each only occurs a single time. The association of the ID with a shaft can then be effected one-time and definitely for the entire lifetime of the shaft. The association of the wagon ID can advantageously be effected upon equipping the wagon with the wheel set and its shaft at the manufacturer or after replacement in the service factory. Then, the ID can be used as an indicator for the start of movement of a wagon. This is relevant if numerous wagons consecutively start. Then, numerous messages can occur consecutively in a short period of time that the movement has been started. The differentiation according to shafts and/or wagons having started the movement can then be effected within one or more evaluation units on one or more shafts or in a towing vehicle (locomotive) or else outside of the train in a portable apparatus.

The motion detection can be advantageously effected in that a signal reported by a movement sensor is compared to a threshold value. Only if the movement signal has a certain continuity above a threshold value, a beginning of the start is signaled or determined. This can be advantageous to exclude short-term impacts and disturbances.

According to an aspect of the invention, the device can have an acceleration sensor. The acceleration sensor can be suitable for determining a static acceleration along at least a first axis (i.e. in a direction along the axis for example of a Cartesian coordinate system). The acceleration sensor can be disposed on a rotating body of the rail vehicle, which rotates in response to a traveling movement of the vehicle such that the acceleration sensor moves upon rotation movement of the wheels of the vehicle (proportionally to the travel velocity) such that the proportion of the acceleration of gravity measured by the acceleration sensor varies due to an angular variation of the first axis with respect to the gravitational field of the earth. Thus, the acceleration sensor can be located in the gravitational field of the earth and experience a rotation movement, whereby the position of the axis, in which it determines the static acceleration (for example the acceleration of gravity), can vary. The acceleration sensor can output a signal representing the measured acceleration.

Further aspects of the acceleration sensor are described below. They can advantageously be combined with the determination of the wagon sequence. Similarly, all of the other aspects of the invention like location, network formation, brake action determination, temperature measurement etc. can be combined with these and other aspects of the invention in advantageous manner. In particular, it applies to the aspects of the invention that they benefit from the arrangement of the device on a shaft of the rail vehicle.

The invention also provides a method for determining the wagon sequence of a rail vehicle. The rail vehicle can then include a plurality of wagons. Therein, for example, the points of time of the occurrence of the same external mechanical effect on the wagons can be compared to each other. To this, advantageously, signals from sensors attached to the shafts of the wagons are evaluated. The sensors can be acceleration sensors.

The invention also provides a method for regular examination of the train completeness of a rail vehicle including a plurality of wagons. Therein, the respectively actually determined train sequence can be compared to a train sequence serving as a reference. The determination of the actual train sequence is effected by means of evaluation of signals from sensors attached to one or more shafts of the wagons.

The previously described device determining the sequence of the train with external events, can advantageously also be used to examine the train completeness at any locations along the section. To this, only comparison between the train sequence determined at the beginning of the travel and stored in an evaluation apparatus and of the actually determined train sequence is required. The evaluation can be effected either in evaluation electronics located on the train or by a stationary equipment, which e.g. is attached besides the track. It can also be advantageous that all of the data determined in the evaluation apparatus is forwarded to a center via a wide-area radio link (e.g. GSM) and central evaluation on the train completeness is effected there. The latter also offers the possibility of immediately initiating further actions if the train completeness does no longer exist.

The above described methods for determining the train sequence can be advantageously configured to generate a list of the wagons of a train. Therein, the evaluation of signals from sensors on the shafts or the shaft of a wagon or all of the wagons of the train can be advantageously configured such that the composition of the train or the so-called wagon sequence is determined. This is known as train setup. It is particularly advantageous that exact synchronization of the clocks in the individual devices is not required to this.

In a brake test, before departure of the train, all of the brakes of a train are first actuated and subsequently again released by the train driver centrally controlled by decreasing and increasing the air pressure in the main air line. The examination if the brake of an individual wagon actually responded, is effected by a suitable pressure sensor element in the brake pressure circuit or a path sensor in the brake linkage, which registers and evaluates the variations. If the brakes of all of the wagons successfully responded, the brake test is considered to be passed. Basically, in the described method there is the problem to differentiate a "usual" operation braking from a brake test. To this, according to this aspect of the invention, advantageously, movement sensors can be provided in the device on a shaft of the rail vehicle, the output signals of which can be evaluated for differentiation between a traveling rail vehicle and a standing rail vehicle. Since only upon performing a brake test, a released brake is first applied and subsequently again released in the stationary state without the train changing its velocity therein, the device according to this aspect of the invention can also be advantageously configured and used for brake test.

According to an aspect of the invention, a wireless network is also provided, the components (network nodes) of which are defined using devices on the shafts of rail vehicles. In particular, network nodes can be located on the shafts of wagons of a train. Preferably, the network can have characteristics of a wireless ad-hoc network. Therein, it can be provided that the devices on the shafts of a rail vehicle spontaneously define themselves as network nodes of a related network. In another configuration, a portion of the electronics (certain sensors etc.) can be located on the shaft of a rail vehicle and another portion of the electronics can be centrally accommodated in a telematics unit at another location of the rail vehicle. Thereby, no limits are set to the composition of trains.

According to an advantageous configuration, the data transmission can then occur along the network from a device on a rail vehicle (for example on a shaft) to a corresponding device on an adjacent rail vehicle (for example another wagon of the same train, in particular to a device on a shaft of the same or another wagon of the train). Thereby, great distances along freight trains or also passenger trains can be bridged. The individual device then only has to be able to transmit to the next wagon (or also shaft). Thereby, energy can significantly be saved. Within a device, authentication and authorization routines and data can be provided. In particular, an association with a rail vehicle can be performed. The devices can be programmed with respect to their association with a rail vehicle in an implementation. Thereby, mis-compositions of networks from devices on rail vehicles are avoided. Then, the network can be configured to determine the wagon sequence of the train. Incidentally, the network can be configured according to all of the further aspects of the present invention, as they are described above and below.

The present invention also relates to a method for retrofitting a rail vehicle with a device attached to a shaft of the rail vehicle. The attachment can advantageously be effected by means of a band wound around the shaft. Therefore, the present invention has the object to provide a device and a method for monitoring rail vehicles, in particular freight wagons, which are suitable for the employment in rail vehicles and allow the simple retrofit of rail vehicles with the device among other things.

According to a further aspect of the present invention, a device for monitoring a rail vehicle with wheels is provided. According to this aspect of the invention, the device can include an acceleration sensor. The acceleration sensor can be suitable for determining a static acceleration along at least a first axis (i.e. in a direction along the axis for example of a Cartesian coordinate system). The acceleration sensor can be disposed on a rotating body of the rail vehicle, which rotates in response to a traveling movement of the vehicle such that the acceleration sensor moves upon rotation movement of the wheels of the vehicle (proportionally to the travel velocity) such that the proportion of the acceleration of gravity measured by the acceleration sensor varies due to an angular variation of the first axis with respect to the gravitational field of the earth. Thus, the acceleration sensor can be located in the gravitational field of the earth and experience a rotation movement, whereby the position of the axis, in which it determines the static acceleration (for example the acceleration of gravity), can vary. The acceleration sensor can output a signal representing the measured acceleration. The device can include an evaluation unit, which is set to receive the output signal of the acceleration sensor, which indicates the measured acceleration, and to determine a mileage and/or a travel velocity of the rail vehicle based on this output signal. The evaluation unit can be set to determine at least the mileage or the travel velocity from the progress of the acceleration values over the time. The evaluation unit can additionally be set to detect at least one error signal from a signal of the acceleration sensor. As later explained, advantageously, a plurality of acceleration sensors can be disposed on the shaft of the rail vehicle in a fixed angle to each other.

The rotating body could be one or more wheels of the rail vehicle itself. However, advantageously, the rotating body is only coupled to the wheels and moves in conformity with the rotation movement of the wheels, which is reflected in a variation of the output signal of the acceleration sensor, which corresponds to the movement of the vehicle. From the sensor signal (variation of the static acceleration), for example, the mileage of the vehicle can be calculated if the wheel circumference of a wheel and the relation between the rotation of the wheel and the rotation of the acceleration sensor are known. The wheel circumference or diameter of the wheel is therefore advantageously stored in the evaluation unit. Furthermore, the evaluation unit can be set to determine an instantaneous velocity or acceleration of the rail vehicle from the sensor signal.

According to an advantageous aspect of the invention, the acceleration sensor is disposed for example at or on a shaft of a vehicle axle coupled to the wheels such that the acceleration sensor moves around a central point of the shaft upon rotation movement of the wheel (for example with the same rotating speed as the wheels on the shaft) upon normal forward or rearward travel of the vehicle. The output signal of the acceleration sensor arising therefrom is supplied to the evaluation unit, which is suitable for determining the mileage of the rail vehicle based on the output signal. In a continuous movement of the rail vehicle in one direction, the acceleration sensor will move around the shaft of a vehicle axle of the rail vehicle and the angle of the axis, in which the acceleration sensor measures the static acceleration, varies with respect to the (or in) the earth's gravitational field (with respect to the field lines of the earth's gravitational field). This is always true if the acceleration sensor as such rotates in the gravitational field of the earth or quite generally in a static gravitational field of a planet as far as the axis, in which the acceleration sensor can determine the acceleration, experiences an angular variation with respect to the gravitational field such that variation of the measured acceleration results. At the same time, these aspects of the invention allow to also determine unintended acceleration values with the same acceleration sensor and to associate them to certain groups of errors.

According to a further aspect of the invention, the evaluation unit is configured to determine the mileage of a complete vehicle or for example freight wagon axle composed of shaft and wheels (thus not immediately of the rail vehicle, but of an individual vehicle axle). This is of great importance especially if the vehicle axles of the rail vehicle are replaced. Thereby, an individual vehicle axle can have another mileage than another vehicle axle of the same rail vehicle. In the context of the present invention, "shaft" designates the shaft of a vehicle axle, which connects two wheels. According to this aspect of the invention, the evaluation unit is attached to the vehicle axle together with the acceleration sensor, for example in an integral (in one housing) compact device.

The evaluation unit determines the mileage of the vehicle axle, to which the sensor (or the device) is attached. In addition, the evaluation unit can be set to determine the mileage of the rail vehicle, thus the traveled distance of the rail vehicle, from the increment (relative increase) of the mileage of one of several or several vehicle axles. While the evaluation of the acceleration signals relating to a vehicle axle can occur immediately in the evaluation unit on the vehicle axle, the already pre-evaluated signals of several vehicle axles can be related and matched to further parameters and signals, respectively, in a central unit (later described in more detail as a telematics unit) of the rail vehicle.

According to the invention, it has been recognized among other things that from the output signal of the acceleration sensor, in which the acceleration measured by the acceleration sensor is reflected, the mileage and/or travel velocity can advantageously be determined by means of electronic evaluation, and at the same time the most important error signals can be determined. In continuous forward or rearward movement of the vehicle, the output signal is a periodic signal, in ideal case a sinusoidal signal. With known wheel circumference, the evaluation unit can advantageously determine the traveled distance of the rail vehicle for example from the period or frequency of the sinusoidal signal (or else from the distance of the maxima or zero points of the sinusoidal signal).

Advantageously, the determination of the mileage or travel velocity is possible from the maxima/minima (extremes) of the output signal of the acceleration sensor. This is because according to the position of the axis or the axes, in which the acceleration sensor measures the static acceleration, an offset (of the measured acceleration values) can occur, which shifts the output signal (measured acceleration) with respect to the zero line. Therefore, zero points are often inferiorly suited than the maxima or the minima of the output signal. An automatic evaluation of the output signal of the acceleration sensor for example in a microcontroller can also advantageously be set to determine the mileage based on the maxima or minima of the output signal and to provide a corresponding output value representing the mileage.

Advantageously, the acceleration sensor can be disposed such that at least one axis, in which the acceleration can determine a static acceleration, is oriented such that angular variation of the axis with respect to the gravitational field does not result upon blockage of the wheels. This can then advantageously be considered in the configuration of an evaluation unit. It can be configured such that it determines a blockage of the wheels of the rail vehicle based on this output signal (or else a plurality of such output signals) of the acceleration sensor. Therein, for example, maloperations or malfunctions of the brakes of rail vehicles can be detected, which entail damages and wear. Often, brakes are not released at all or not properly released in switching or the brake force is not properly adjusted with respect to the loading state. A device according to the invention can be set to detect these errors. In particular, the evaluation unit can include a real-time clock and provide the occurrence (beginning) of a blockage of the wheels with a time stamp and optionally determine the duration of the erratic behavior.

Advantageously, the acceleration sensor can be disposed on an outer circumference of a shaft coupled to the wheel (e.g.

an axle connecting two wheels of the rail vehicle). Basically, the acceleration sensor can also advantageously be disposed on the wheel or in or on the hub. However, according to the invention, the arrangement on a shaft of a vehicle axle was realized as particularly advantageous for the above mentioned reasons. Therein, the sensor or the assembly, in which the sensor is accommodated, can rotate as a whole substantially around the shaft and therein around the own axis. With an arrangement on wheel or hub, advantages according to the invention can also be achieved.

Advantageously, the acceleration sensor can be disposed such that a first axis, in which the acceleration sensor can determine the static acceleration, points in the tangential direction on the outer circumference of the cross-sectional area of the rotating part, to which it is attached (e.g. the shaft of a vehicle axle). Acceleration sensors typically have one, two or three axial directions orthogonal to each other (also referred to as axes or dimensions), in which they can determine the accelerations. To each of these axial directions (axes, dimensions), an output signal can be provided by the acceleration sensor. Since the sensors also can determine a static acceleration (for example acceleration of gravity) in each of these directions, the output signal of the acceleration sensor typically provides information on the variation of the acceleration value in one, two or all three directions. If one of the axes of the acceleration sensor points in the tangential direction, thus the rotational direction of the shaft of a vehicle axle, thus, a sinusoidal output signal results with constant rotating speed. Besides, the output signal also provides information on the angle of rotation or the position of the wheel in slow movements or even in the standstill.

A beneficial distance of the movement sensor to the center of the shaft of a vehicle axle is for example about 100 mm. Advantageously, the acceleration sensor then can move on a circular path with a diameter of ca. 200 mm upon rotation of the shaft. A typical diameter D of a rotating body (for example shaft of a vehicle axle), on which the acceleration sensor is disposed, can be D=173 or 160 mm. It could be ascertained that in about this distance a signal is provoked in typical movement sensors, the characteristics of which promote evaluation with respect to mileage, rotation movement and certain error conditions. The closer the sensor is disposed to the center (related to the cross-section) of the shaft or of the rotating body, the less the signal is possibly superimposed with disturbance values with respect to certain evaluation signals. However, the center is usually difficult or not at all to access. Arrangement in the hub of a wheel can also be advantageous as far as it is accessible, but is hardly suitable for retrofitting.

Advantageously, the acceleration sensor can also be disposed such that a second axial direction, in which the acceleration sensor determines the acceleration, points from the center of the shaft in the radial direction with respect to the cross-sectional area of the shaft (or of the rotating body). If a sensor with two axial directions is used and disposed according to this aspect of the invention, thus, the acceleration in radial and also in tangential direction can be determined. Therefrom, the rotational direction of the wheel can be advantageously determined, because the output signals associated with the respective axis are in a specific phasing to each other depending on in which direction the wheel or the wheels of the vehicle rotate. An evaluation unit according to this aspect of the present invention is then advantageously configured such that it determines the phasing of the output signals and derives information on the rotational direction of the wheel therefrom.

Finally, the acceleration sensor can be advantageously disposed such that a third axial direction, in which the acceleration sensor can determine the acceleration, points transversely to the travel direction, for example in axial direction of the shaft. Hereby, for example, the inclination of the vehicle or of the shaft or of the vehicle axle can also be determined Thereby, cornering or specific external error states can be inferred for example, which can also be automatically identified and for example be stored and/or transmitted with the time of their occurrence (time stamp).

Thus, the acceleration sensor can be designed as a 1-dimensional, 2-dimensional or 3-dimensional sensor, in which the axial directions, in which the acceleration is determined, are each orthogonal to each other in pairs. A plurality of 1-, 2- or 3-dimensional sensors can also be used at different locations of the axle circumference, which facilitates the evaluation, since e.g. the offset arising by centrifugal force as a disturbance value can be avoided.

A device according to the present invention can advantageously have an acceleration sensor, an analog-digital converter, a battery for power supply, a microprocessor for pre-evaluation or else for extensive evaluation (according to the above mentioned aspects) of the output signals of the sensor, and a memory for storing information of the output signal of the acceleration sensor. In addition, a radio module for transmitting of the at least preprocessed (e.g. digitized and examined with respect to an error pattern) or stored data can be provided. The acceleration sensor(s), the memory, the radio module and/or the microprocessor as well as further components can advantageously be accommodated in a common robust housing. This housing (device) is advantageously attached to the vehicle axle (shaft). For avoiding imbalance, ideally, a counterweight is to be provided for example on the opposing side of the shaft of a vehicle axle.

First, the evaluation can be set to provide the determination of the mileage, thus the kilometer reading or the traveled kilometers or the traveled distance of the vehicle. Besides the determination of the mileage or inclination of the wheels or the vehicle axle, it can also determine damages to the rotating object (e.g. bearings or running surface, in particular flats) based on the detection of deviations from the sinusoidal course. If deviations from the sinusoidal shape repeat periodically with the frequency of the axle with the same axle angular position, this indicates disturbances for example on the wheels or in the bearing. The evaluation unit can then be set to automatically identify and differentiate this type of errors (certain error patterns). The storage and/or transmission can then be effected in the form of an error code possibly with a time stamp.

In similar manner, by means of an evaluation unit set according to the invention, which receives sensor signals from the acceleration sensor on the rail vehicle, damages to the ground (e.g. the rail) can be determined by means of the detection of singularly appearing acceleration values in vertical direction. The storage and/or transmission can then be effected in the form of an error code possibly with a time stamp.

Finally, impacts in transverse direction (e.g. upon loading) or impacts in longitudinal direction (e.g. by switching impacts) are possible by evaluation of variations of the acceleration in horizontal direction. The evaluation unit can be set to detect them and to associate them to a type of error. The storage and/or transmission can then be effected in the form of an error code possibly with a time stamp.

In order to detect horizontal and vertical impacts, the acceleration values of the acceleration sensor along the first and the acceleration values along the second axial direction (radial and tangential to the rotating body or the shaft) are required. Due to the previous knowledge of the arrangement of the sensor on the rotating body, the direction of the impacts can be inferred from the vectorial resultant of the accelerations. I.e. it can be determined from the sensor signals, in which direction (for example vertical or horizontal) an impact has occurred. Advantageously, impacts in horizontal direction should be detected, which are equal to or greater than 2.4 g (g=acceleration of gravity), because it could be ascertained that impacts from this strength on entail an increased risk of damage or indicate irregular handling of the rail vehicle. Such signals can also be stored and/or transmitted with a specific error code and optionally time stamps.

Loss of the wheel-rail contact (e.g. by derailment) can also be detected, for example if a continuous superposition of the sinusoidal signal with disturbance values is detected in all axes partially with periodically recurring signature in vertical direction with constant distance of time (sleeper spacing frequency).

By registering non-periodical acceleration values (vibration) without a periodic signal being measured in the meantime (i.e. the axle does not rotate), a blockage of the wheels can be determined. The detection of this error imposes increased requirements to the electronics, because this error can occur from the standstill. Therefore, the evaluation unit should advantageously be configured such that it is capable of determining movement of the rail vehicle with and without rotation of the wheels or of the shaft. To this, the device can have an additional vibration sensor on the vehicle axle, which determines the beginning of a vehicle movement based on an increased vehicle vibration, and only thereupon the acceleration sensor is activated. This can considerably reduce the energy consumption. This can also advantageously be used for determining the wagon sequence.

Advantageously, the evaluation unit can also be set to determine or additionally verify the rotating speed of the axle by evaluation of the constant component induced by the centrifugal force in the second axial direction (radial direction). This quantity can be used for control or plausibility check of other sensor signals. The constant component caused by centrifugal force can be avoided by use of two tangential acceleration sensors attached to the shaft advantageously in the angle of 90°.

According to an advantageous aspect of the invention, a method for monitoring a rail vehicle is also provided. Therein, a static acceleration along at least a first axis is measured, wherein the axis rotates in the gravitational field of the earth according to a rotation movement of the wheels of the vehicle such that the proportion of the measured static acceleration varies due to an angular variation of the first axis with respect to the gravitational field of the earth. From the measured acceleration values in one, two or three axial directions (as previously explained), then, the travel velocity or mileage or both is calculated. In addition, the rotating speed of the rotation movement for example of a rotating body (for example the wheels, the shaft, a hub etc.), mileage, velocity (frequency of the sinusoidal signal) travel direction (from the phasing of two sinusoidal signals) and numerous different other signals and at least one disturbance or an error condition of the rail vehicle can be determined from the acceleration signals.

An advantageous aspect of the present invention is also in that rail vehicles can be retrofitted or equipped with the device according to the invention without particular intervention and in simple inexpensive manner. Therefore, the present invention also provides a method for retrofitting rail vehicles with wheels, in which the rail vehicles are equipped with a device for monitoring the rail vehicle. Therein, devices according to one or more aspects of the invention, as previously explained, can be used. It can be advantageous to couple one or each shaft of a rail vehicle, of a wagon of the rail vehicle or of all of the wagons including towing vehicle (one or more) to one or more devices in the manner according to the invention.

Therein, an acceleration sensor, which can determine a static acceleration along at least one axis, can be disposed on a rotating body (for example advantageously on a shaft connecting two wheels) of the rail vehicle such that the acceleration sensor moves upon rotation movement of the wheels of the vehicle (advantageously proportionally to the travel velocity) such that the proportion of the acceleration of gravity measured by the acceleration sensor varies due to an angular variation of the axis with respect to the gravitational field of the earth. In addition, an evaluation unit is to be provided directly at the acceleration sensor, thus also on the rotating body (for example shaft), anywhere on the rail vehicle itself or outside of the rail vehicle. The evaluation includes the detection of at least one error or a disturbance of the traveling operation of the rail vehicle such as for example a blockage of the wheels. Advantageously, the transmission of the already at least partially evaluated output signals of the acceleration sensor is effected wirelessly for example in the form of a km reading and/or an error code. By the arrangement on a shaft according to the invention, any major intervention in the rail vehicle is avoided as it is required with two-part transducer-sensor systems. In addition, the error source of deficient adjustment of transducer and sensor inevitable in two-part systems is avoided. All of the important vehicle values (mileage, velocity, error, chassis diagnosis) can be determined by means of a compact sensor (device) for example on the shaft of the rail vehicle.

In an advantageous configuration, the device is attached to the shaft or the shaft of a vehicle axle or else freight wagon axle with a circumferential steel band, which further reduces the retrofitting effort. Therein, advantageously, materials can be employed, which keep the corrosion between steel band and shaft low. In particular, a layer of a plastic material or polymer can also be inserted between the shaft and the steel band. It has become apparent that the device, in which very different electronics, location filters, brake and/or temperature sensors, infrared and/or distance sensors, movement sensor, vibration sensor, acceleration sensor and/or the evaluation electronics are disposed, should be disposed on the shaft of the vehicle axle. Advantageously, the device can be configured such that torsional forces as low as possible on the device (e.g. device) are produced. Therefore, the extension of the device (device) towards the shaft (along the central axis of the shaft) can be as small as possible. An arrangement of the device (device) approximately in the center of the shaft of the vehicle axle is also advantageous. The ratio of height H to width B of the device (housing dimensions) should not fall below H:B=1:2; thus, the device should maximally protrude from the shaft in radial direction only half as far as it extends in axial direction of the shaft. This promotes the attachment with a circumferential steel band (or else two parallel steel bands). With respect to a diameter D of the shaft of the rail vehicle, the height H and width B of the device can be approximately in the following ratio: D:H:B=4:1:2. If one also considers the width of the steel band S, thus, the following approximate advantageous ratio results: D:H:B:S=6:1.5:3.3:1. Advantageously, it should not be departed from this ratio by more than 50%. It has become apparent that the resistance to torsional forces is thereby increased.

Besides the acceleration sensor, a battery, a microprocessor, a data storage and a radio module can be disposed in the device on the shaft (for example shaft of a vehicle axle or freight wagon axle). The output signals of the acceleration sensor can then be evaluated corresponding to the above description. Advantageously, the sensor system only consists of one compact part attached to the rotating body. This part can be fixedly connected to the rotating body, for example a vehicle axle (or shaft of the vehicle axle) of the vehicle and does not have to be separated from the vehicle axle or shaft of the vehicle axle upon repair works. Then, it can be integral, compact and easy to mount in order to keep the service or retrofitting effort low. Since movable components are not present in the sensor, the device according to the invention is virtually wear-free and does not require any interventions in the chassis. Thus, a device according to the invention attached to the rotating part for example can be advantageously be composed of a one- to three-axis (for example micromechanical or piezoelectric) acceleration sensor, a battery for energy supply, a microprocessor for data processing and evaluation, a real-time clock, a memory for intermediate storage of the data, a radio module for transmission of the data to a suitable reading apparatus or further evaluation apparatus and a housing.

In addition, advantageously, a counterweight for avoiding imbalance is to be provided. It can be attachable to the vehicle axle or shaft in similar manner to the device with the steel band. It can also be advantageous to use a battery as the counterweight. These components can be protected from external influences in a housing and mounted to the vehicle axle (or shaft) to be monitored. To this, any changes to the system to be monitored are not required. For avoiding imbalance, upon sensor assembly, the counterweight can be mounted on the side of the vehicle axle or shaft of the vehicle axle opposing the sensor.

After putting in operation, the device according to the invention measures the variation of the gravity depending on the angle of rotation of the rotating body (for example an axle or shaft connecting two wheels) and evaluates the data in order to determine the mileage and optionally at least one error (optionally along with associated error code) therefrom. The information derived therefrom is for example stored in the module and transmitted to a suitable evaluation apparatus for example via radio on demand or at preset points of time, in order to there determine the travel velocity or mileage. Unlike conventional solutions based on two components (transducer and sensor), the reference point of the system according to the invention is the earth or the gravitational field of the earth.

According to a further aspect of the invention, a device configured as above described can be attached to one or advantageous each vehicle axle of a rail vehicle.

In an advantageous configuration of the invention, a telematics unit can be provided on the rail vehicle, which wirelessly receives data from the device or devices (for example one on each vehicle axle). This data can be the velocity, the mileage, the speed of the vehicle axle or of the shaft of the vehicle axle. Advantageously, especially not the acceleration values (i.e. the for example analog sensor signals) themselves are transmitted, but values based on preprocessing of the data. Therein, advantageously, there come into consideration: the speed of the vehicle axle, the mileage (km reading), the velocity, the rotational direction of the vehicle axle and specific error codes, which can relate to errors such as for example blockage of the wheels or the vehicle axle, impacts in horizontal or vertical direction and derailment. In addition, the point of time and optionally the duration of the error can be transmitted to each error. The telematics unit can be set to forward the data by means of mobile radio technology (GSM, UMTS etc.). It can also include a GPS (Global Positioning System) unit for determining the position. The telematics unit can very advantageously include a vibration sensor in order to be able to determine when the vehicle begins to move. This allows to save energy. Besides mobile radio, communication via satellite also comes into consideration, since rail vehicles, in particular freight wagons, can be on the way in areas without the required infrastructure or network coverage.

Not only data relating to the rotation movement of the shaft, but also error information is determined and transmitted. Therein, especially blockages of the wheels as well as vertical or horizontal impacts come into consideration. As error messages, the evaluation unit in the device can for example detect bearing damages, derailments or blockages of the wheels and assign an error code to them, which is then transmitted.

In particular with respect to the detection of the blockage of the wheels, the evaluation unit can be configured to only activate upon exceeding a maximum vibration level. For detecting this type of vibration, advantageously, the acceleration sensor is not used, because the absorption of energy would be too high for this. It has become apparent that it is advantageous to provide a further sensor, which should be a vibration sensor with very low current drain. Preferably, it is set and evaluated such that only with a sufficiently strong vibration, the further circuit parts are activated. To this, for example minimum levels and minimum duration of the vibrations can be stored as threshold values in the device.

In wheel blockages, it is to be considered that unlike for example anti-lock braking systems, in the present sensor system it is essential to determine that the wheels or the shaft fixedly connected to the wheels will not rotate with movement of the rail vehicle.

Overall, the energy supply of a device attached to a vehicle axle or shaft of a vehicle axle should be configured such that it autonomously has about 6 years of operating time, without having to be charged in between. In particular, batteries of the type C (C cells) or the type D (D cells) come into consideration. They possess a suitable energy supply in combination with a beneficial design. It can be convenient to use for example two C cells instead of one D cell in order to distribute them on the circumference of the shaft such that they at least partially compensate for each other with respect to the weight distribution. Accumulators (rechargeable batteries) surprisingly have proven to be less suitable. Insofar, according to an aspect of the invention, a device according to one or more of the aspects disclosed here is also provided, which includes one or more batteries with the above mentioned characteristics.

According to a further aspect of the invention, a device is provided, which is disposed below a rail vehicle, advantageously on a shaft of the rail vehicle, and which is configured to acquire the characteristics of the load of the rail vehicle. For example, the device can be configured to determine the loading state of the rail vehicle. The device can also be configured to identify the loading of the rail vehicle. The device can also be configured to control or regulate the loading or unloading of the rail vehicle. In particular, load containers can be acquired and the loading state thereof can be advantageously acquired. To this, the device can advantageously use radio signals. In an embodiment, RFID tags on the load elements can be read out by the device. To this, the device on the shaft of the rail vehicle advantageously has a reading device for radio signals. Other methods of acquisition also come into consideration. This aspect of the invention advantageously exploits the circumstance that many rail vehicles, for example freight wagons, possess a wooden floor, which does not shield the radio link from below the rail vehicle. Therefore, the arrangement of the sensor below the rail vehicle according to the invention is particularly suitable to perform the acquisition and control of the loading from there, which can be used for logistic purposes from there, for example in cooperation with a corresponding wireless infrastructure as it is described herein.

According to further aspects of the invention, an infrastructure can be provided, which acquires and centrally evaluates the data from acceleration sensors attached to vehicles, in particular rail vehicles such as freight wagons according to the invention and fitted according to the invention. Thereby, utilization and monitoring data can be provided, which improves the logistics for rail vehicles in simple manner. Therein, it is added in advantageous manner that the rail vehicles can be retrofitted very simply and without lengthy approval procedure. Advantageously, the rail vehicles can possess a telematics unit, in which data from the devices attached to one or more vehicle axles or shafts of vehicle axles is collected and forwarded.

According to an aspect of the invention, it has been recognized that the acceleration sensors can be employed as rotation sensors, thus for mileage determination, velocity determination etc. and also can determine error conditions in this function. Therefore, a particularly advantageous synergistic possibility of utilization of the acceleration sensors arises for rotation-related parameters and disturbance values. Therein, it has been surprisingly ascertained that the acceleration sensors disposed for detecting a rotation movement can also be configured for detecting the most important misoperations of rail vehicles. In addition, it has become apparent that it is advantageous to combine the acceleration sensors with at least one vibration sensor in order to be able to better detect one of the most important errors, namely the blockage of the wheels, without unduly stress the highly sensible energy budget of the sensor therein. Especially with respect to the energy budget, unexpectedly particularly advantageous partitions of the evaluation could be found. Herein, the energy balance with respect to the transmission of data, pre-evaluation and storage of data is considerable. The invention additionally provides a reliable possibility of differentiating the vehicle axles or shafts of vehicle axles related mileage in rail vehicles (thus mileage per vehicle axle of the rail vehicle) and to perform vehicle evaluations therefrom, which extend beyond the simple overall mileage of the rail vehicle. Unlike motor vehicle applications, in rail vehicles basically other parameters are of interest, which require a completely different evaluation and arrangement. The evaluation according to the present invention additionally should be capable of detecting in particular horizontal impacts above 2.4 g.

A mobile apparatus for reading out and registering data in the device should be set to conflict-free communicate with a plurality of devices in proximity. To this, only few or only a single device can be activated by means of a specific sensor (for example reed sensor) and an exciter (for example magnet). Radio protocols can provide other advantageous possibilities, which allow to make contact with a plurality of devices at the same time and to uniquely identify them based on identification numbers. In particular, a plurality of freight wagons can be at a freight depot at the same time, which can have a device on each vehicle axle. These devices advantageously can be read out and written by a central radio station. In another configuration, reading out and writing is effected by means of a mobile apparatus, which is brought in proximity of the respective device. In a further configuration, the communication with the devices of the vehicle axles occurs by means of the telematics unit. As possible, it should be disposed such that it can well receive GPS signals, if it is provided for GPS. An arrangement laterally in the upper region of the rail vehicle is convenient.

In another configuration, a GPS receiver can also be disposed in a device on the shaft of a rail vehicle. Therein, possible shadings and reflections are to be considered.

For particularly security-related applications, the storage of the data in the device should not only be non-volatile (for example EEPROM or the like), but also be protected against manipulation. In addition, a device associated with a vehicle axle can be protected from exchange for example by measures such as lead seal. The device can encrypt the internal data and provide an authentication inquiry before the data can be read out or manipulated. Therein, it can be differentiated between persons with different functions. For example, the evaluation unit in the device can provide that only certain service personnel is approved for reading out or manipulating certain data.

In summary, some aspects of the present invention allow the attachment of components to a rail vehicle in advantageous manner. Among other things, the invention is based on the realization that the shaft of a rail vehicle can advantageously be used for attaching a device, in particular electronics. The attachment of the device in particular has to be very robust, but offer contact surface with the shaft as small as possible. Hereby, water accumulations are avoided, thereby reducing the corrosion of the shaft. A notch effect on the shaft should absolutely be avoided. Similarly, damage to the varnish should be absent. A band used for attachment can be manufactured from steel. However, then, it is convenient to use a further material such as for example a polymer or the like on the inner side of the steel band, thus the side facing the shaft. It could have a knob profile or else a car tire profile on the side facing the shaft. Hereby, the contact surface is further reduced and the materials are protected. As the attachment material, in particular softer materials than that of the shaft or of the varnish layer on the shaft come into consideration. Knobs and tire profiles also can be used on the side facing the steel band since here too corrosion aspects can be relevant. The attachment of the device to the shaft should be slip-resistant.

An important characteristic, which could be determined by a device on the shaft of a rail vehicle, is if the travel of the rail vehicle decreases due to a brake action or for other reasons. Therein, the device in particular can be configured such that it can differentiate between an ascent and braking of the vehicle. To this, advantageously, an acoustic sensor can be provided in the device disposed on the shaft. The electronics can then be configured to evaluate characteristic waves or spectra. Similarly, the employment of an infrared sensor in the device on the shaft comes into consideration. Hereby, so-called hot boxes can be identified. An infrared sensor can in particular be used in the pulsed or interval operation. Hereby, long operating times of the infrared sensor can be achieved. This is of particular importance upon employment on rail vehicles.

Thus, the present invention generally relates to devices and methods associated therewith, which are based on attachment of a device to the shaft of rail vehicles. These devices can advantageously include the one or more of the above described sensors and/or one or more aspects of the invention. To this, the device can include one or more parts, which can be individually or collectively coupled to the shaft of the rail vehicle. Therein, they can be disposed to minimize centrifugal or torsional forces. A portion of the electronics can also be provided at another location on the rail vehicle (telematics unit) as long as at least one portion of the electronics is also attached to the shaft.

According to a further aspect of the invention, a device attached to a shaft of a rail vehicle and configured according to one of the above aspects of the invention, can further be configured to determine a frequency of a natural vibration of the shaft. In particular, the device can be configured to determine a variation of the frequency of a natural vibration. This aspect of the invention is based on the realization that damages and varying stress of a shaft can result in shift of the natural resonant frequency of the shaft. In operation, the shaft is excited to the natural vibration in very different manners. It can be continuously detected in the device according to the invention, which is attached to the shaft of the rail vehicle. If the natural resonant frequency deviation exceeds a certain threshold value, thus, an alarm can be triggered, if the variation indicates that the shaft is damaged. Similarly, variations of the natural resonant frequency with respect to the stress or the wear of the shaft can be evaluated. In particular, an evaluation unit within the device on the shaft is configured to perform this evaluation of the variation of the natural resonant frequency. According to this aspect of the invention, thus, the device is configured to exploit a natural frequency of a shaft of a rail vehicle by means of a device attached to the shaft in order to perform a damage analysis in the running operation, in particular during travel of the rail vehicle.

According to a further aspect of the invention, separate excitation of the vibration of the shaft is not required. Rather, the normal customary excitations of the shaft are exploited to this. Further, the device can be configured to determine the stress of the shaft by means of the shift of the natural resonant frequency of the shaft. In particular, crack formations on the shaft can result in variation of the natural frequency (natural resonant frequency). In this manner, damages to freight wagon wheel sets can be identified early and during the running operation. Similarly, it is possible to measure the weight of the actual load. The device on the shaft is in particular configured to exploit impacts for example upon loading and unloading, in switching or in running over bumps, for example switches or interfaces between rails, as well as by slight bumps on the running surfaces and/or on the rails for excitation of the natural vibration of the shaft of a wheel set.

To this, the device according to the invention can have vibration pick-ups (for example acceleration sensors, structure-borne sound microphones etc.), which are configured to detect and to analyze the natural vibration of the shaft. According to an aspect of the invention, the analysis of the vibration can be effected immediately in the device on the shaft and be compared to set values. A deviation from a set value can be determined with indication of the identification of the device on the shaft with respect to a certain wheel set or a certain wagon, and for example be forwarded by means of radio communication. By comparison to the set value of a natural vibration or by comparison of spectra of the natural vibrations, thus, it can be early determined if damages to a shaft loom and if danger can result therefrom.

According to an aspect of the invention, the device according to the invention is configured to determine a bending stress of the shaft by means of determination of the natural resonant frequency. The bending stress is a result of offset points of application of the load to be supported by the shaft, but also by the own weight of the shaft itself. It has become apparent that the bending stress of the shaft can change the natural frequency of the shaft. The device according to the invention is therefore in particular configured to determine this shift of the natural frequency due to a bending stress.

Herefrom, according to a further aspect of the invention, the weight of the actual payload of the wagon can be determined. The greater the weight of the payload is, the greater the bending stress of the shaft and thus the shift of the natural frequency of the shaft are. This can be advantageously utilized in particular with an undamaged shaft. With a damaged shaft (for example crack formation), besides the previously described effect of variation of the natural frequency spectrum upon bending stress, a bending strength of the shaft depending on the angle of rotation of the shaft can also be detected. With rotating shaft, thereby, the natural frequency spectrum of the shaft is modulated with the rotational frequency of the shaft. A device according to the invention is then configured to detect this modulation. A damage analysis according to an aspect of the invention accordingly can include the evaluation of the modulation of the natural frequency of the shaft with the rotational frequency of the shaft. The invention also relates to a method according to one of the above aspects, in which the variation of a natural frequency is captured and evaluated. Methods and devices for determining and evaluating the variation of a natural frequency advantageously can be combined with one or more of the further aspects of the invention mentioned above and below. In particular, a sensor, which can determine the natural frequency or natural resonant frequency shift, is advantageously provided on the shaft of a rail vehicle.

Further aspects of the present invention are apparent from the description of embodiments based on the attached figures.

DETAILED DESCRIPTION OF THE INVENTION

Figure 1:
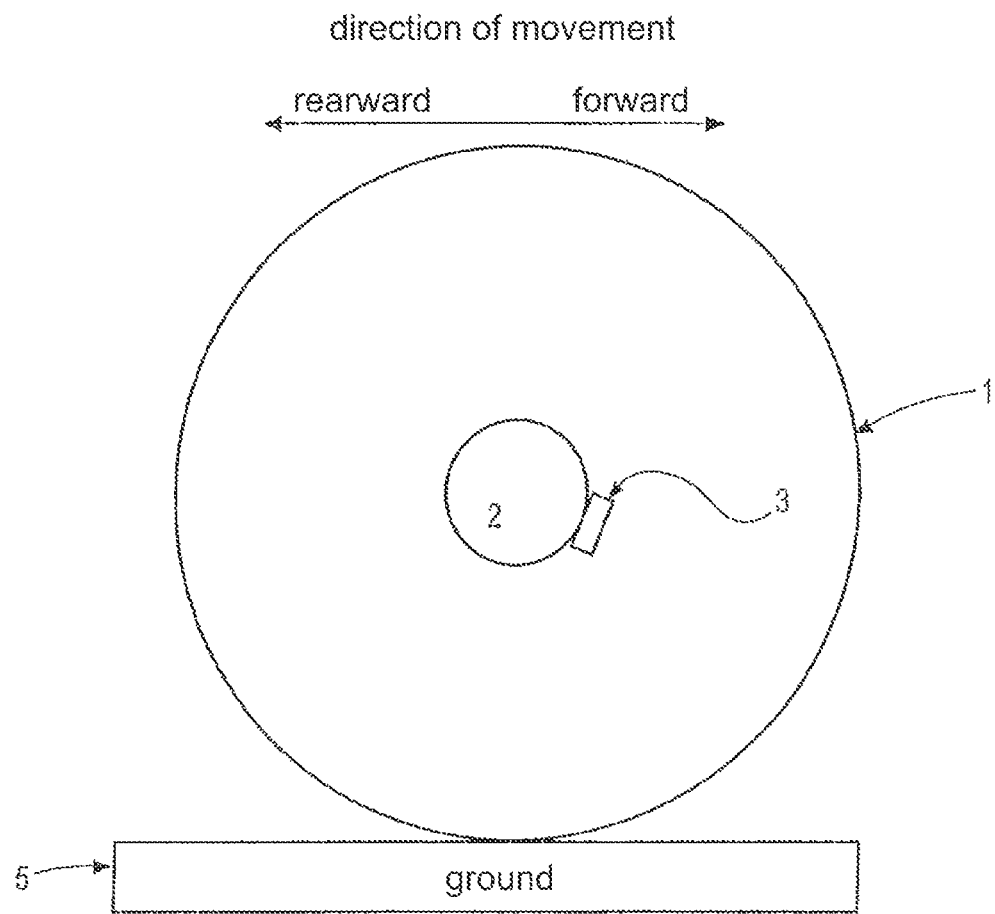
FIG. 1 shows a device disposed on a shaft of a rail vehicle according to the aspects of the present invention.

FIG. 1 shows a simplified representation of a section of an embodiment of a device according to the invention. A wheel 1, for example of a rail vehicle with a superstructure (not shown), is represented. A vehicle axle or the shaft 2 of a vehicle axle (in the context of the present invention often simplifying only referred to as shaft) is attached to the wheel 1, which protrudes into the image plane such that only its cross-sectional area is represented. The shaft 2 can typically connect two similar wheels 1 of the rail vehicle. A device 3 is disposed on the shaft 2, which can be configured according to different aspects of the invention described herein. Quite generally, the device is disposed on the shaft instead of other locations of the rail vehicle. The wheel 1 rolls over the ground 5, which can for example be a rail, upon forward or rearward movement of the rail vehicle. In the device 3, very different sensors, for example a microprocessor, a memory, in particular semiconductor memory, a radio module or radio modules for receiving and/or transmitting data, can be provided. Insofar, a partial or complete preprocessing of the received or acquired data can already be effected within the device 3. Based on the sensor signals, then, the traveled distance (mileage), standstill, blockage of the wheels, velocity, abnormal operating states (wear, derailment), track damages, switching impacts and operating duration, temperatures, positions, vehicle states, operational states etc. can be determined among other things.

Figure 2:
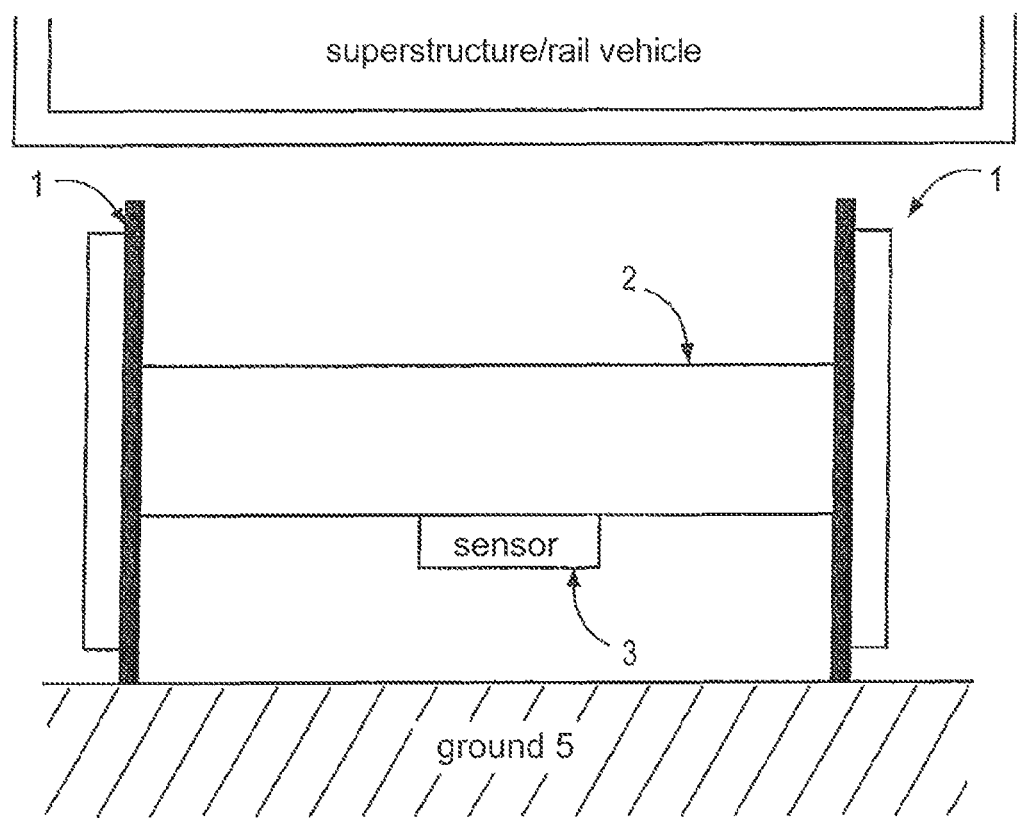
FIG. 2 shows a further representation of a device disposed on a shaft.

FIG. 2 shows a further simplified representation of the embodiment according to FIG. 1. The wheels 1 and a shaft 2 of a rail vehicle are illustrated, on which an inventive device according to an embodiment of the invention is disposed. In particular the device 3 can be seen, which can include sensors and further electronic components for preprocessing and transmitting the data, as previously explained. The superstructure of the rail vehicle can be completely differently designed, for what reason the attachment of the device to the shaft is particularly advantageous.

Figure 3:
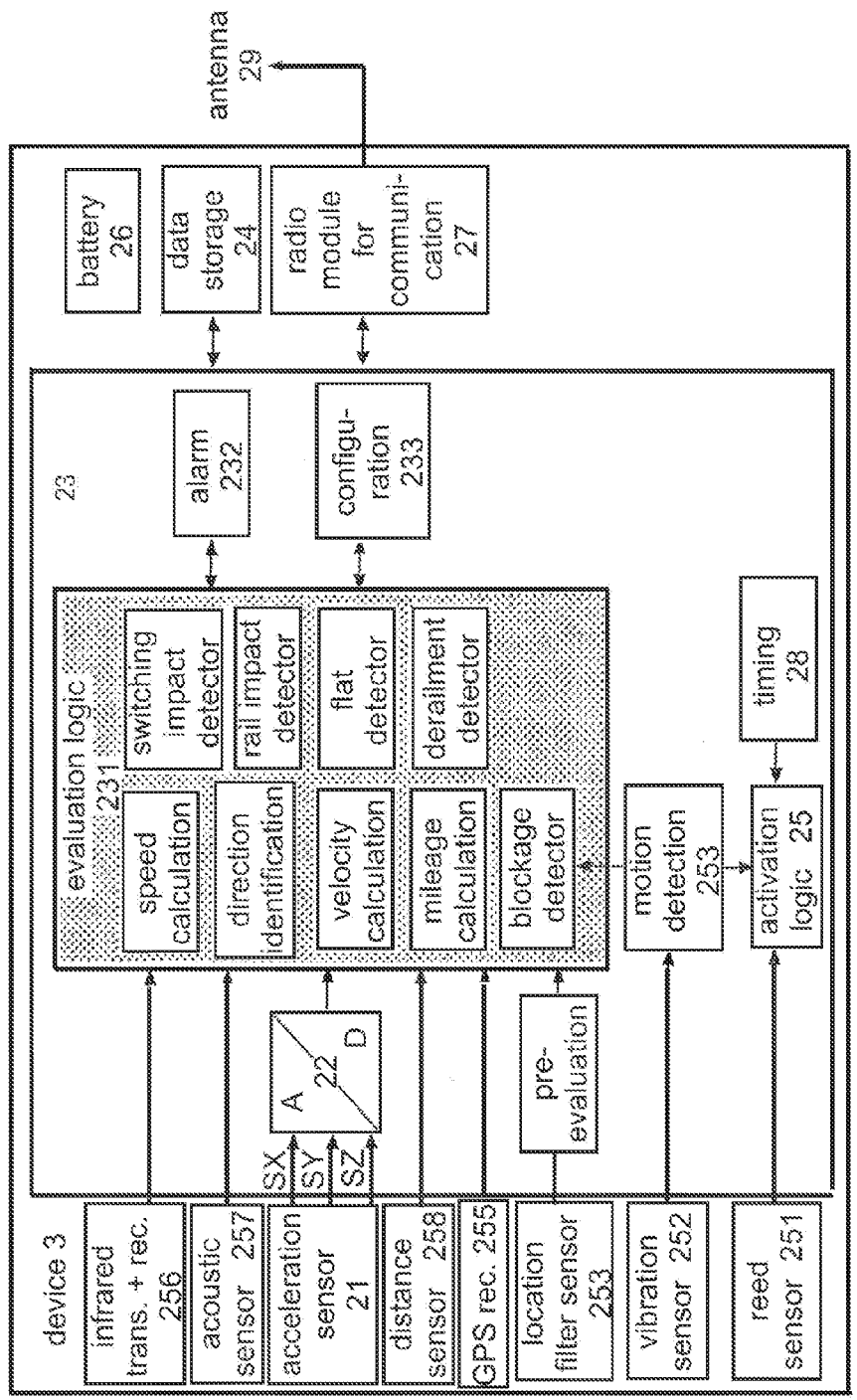
FIG. 3 shows a simplified block diagram of a device according to an embodiment of the invention.

FIG. 3 shows a simplified block diagram of a device 3 as it can be attached to a shaft 2 of a rail vehicle. The device 3 can include different sensors depending on configuration and process, store and forward the signals thereof to different extent. In particular, the sensors can be an infrared sensor 256 for temperature measurement, a structure-borne sound sensor 257 for capturing the vibrations of the shaft, an acceleration sensor 21, a distance sensor 258, a GPS receiver 255 for positioning, a location filter sensor 253 depending on implemented location filtering function, a vibration sensor 252 and/or a reed sensor 251.

The infrared sensor 256 can evaluate infrared signals in order to thus determine the temperature of the shaft, of the wheel 1 or of other parts of the rail vehicle or of the environment. An advantageous application of the temperature measurement in combination with the infrared sensor is the identification of hot boxes. A corresponding error message can then be stored and/or communicated to the outside by the device. Thereby, damages can be avoided. The infrared sensor can advantageously be pulsed and/or operated in intervals to consume only low power. An infrared sensor can advantageously be employed for imaging the brake disc.

The structure-borne sound brake sensor 257 generally can serve for determining whether or not it is braked. Thereby, it can be determined whether the travel decelerates for example due to an ascent or because it is braked. In use of the structure-borne sound sensor, characteristic waves or spectra can be detected.

The acceleration sensor 21 can measure static accelerations in one, two and/or three directions (X-, Y- and Z-axis according to FIGS. 1 and 2) and accordingly outputs three signals SX, SY and SZ associated with the axes (3-dimensional sensor). In simplified implementations, it can also be a 1- or 2-dimensional sensor. In the present embodiment, they are analog signals and therefore are first digitized in the analog-digital converter 22. The digitized sensor signals are then supplied to an evaluation logic 231 coupled to the analog-digital converter 22. The evaluation logic 231 or evaluation routine, which in the simplest case is only suitable for storing the received sensor data in the data storage 24 and/or for transmitting this data by means of a radio module 27 via an antenna 29 to a further evaluation unit, can be wired or implemented as an embedded microcontroller system. Besides, the device 3 can include an activation logic 25 and a motion detection 253, which provide for the device only being turned on if it is required. To this, the activation logic 25 can be coupled to a reed sensor 251 excited for reading out or registering data from or in the device 3 by means of an external field. This can occur upon approaching a writing/reading apparatus 12 (later described). The reed sensor 251 can in particular be activated in that a magnet is temporarily held in proximity (a few centimeters) of the mileage sensor 3. An advantage of the use of the reed sensor is that it does not require energy itself, but only the activation logic 25 consumes current. However, the current drain of the activation logic 25 can be kept very low. The reed sensor is very inexpensive. It is contact-free and contactless and can thereby be integrated in a robust housing without problem. A further advantage can be achieved if a small distance between the magnet and the device 3 is set for activation. Thereby, it is possible to specifically activate only a certain device 3 if several devices 3 are installed on a freight wagon.

The motion detection logic 253 can advantageously be coupled to a vibration sensor 252. Due to the long time of 6 to 7 years that a device 3 is to autonomously operate, an adapted energy management is advantageous. A vibration sensor 252 should be configured as possible to equally capture vibrations in all directions. The current drain also should be very low. An advantageous vibration sensor for the employment in the present embodiment can be a vibration sensor according to the ball switch principle. The vibration sensor 252 can be coupled to a voltage with a large series resistor and be coupled to a motion detection logic 253. It provides that an edge is generated in a signal with each vibration. These edges are advantageously integrated (counted). An activation of the device 3 is only effected if a maximum number of edges (vibrations) has been exceeded (for example within a certain time window). Thereby, it can be ensured that the activation is not effected too early or with too low vibrations as a result of loading the rail vehicle. The vibration can be stored in the device as a parameter in the form of a noise level or a maximum number of vibrations. Thereby, specific vehicle or utilization peculiarities can be taken into account. By the activation of the device 3, the acceleration sensor 21 is also only then activated, which is employed for determining the rotation of the shaft 2. Advantageously, thereby, it can be determined if the shaft 2 rotates and if optionally a blockage of the wheels is present.

A timing 28 for providing a time base (e.g. real time and/or timing for the components of the device and for evaluating the signals by means of a time normal) can also be provided. A battery 26 provides the required energy, wherein accumulators or other energy generators of course can also be provided alternatively, which allow autonomous operation of the device 3 as long as possible. Advantageously, batteries come into consideration, which provide 8 Ah or 19 Ah. This is the case with C cells or D cells. Thereby, a runtime of 6 to 7 years can be achieved with the device 3 set according to the invention.

The evaluation in the unit 23 can extend beyond intermediate storage and/or transmission of the sensor data SX, SY and/or SZ. It can be provided to perform certain evaluation steps already within the device 3 to reduce the amount of data for storage/transmission or to make subsequent evaluation dispensable. Thus, for example, the number of the revolutions of the wheels or the traveled distance could be immediately provided based on the sensor signals SX, SY and SZ. In addition, certain error signals (blockage of the wheels) could be calculated and/or transmitted with time designations such as point of time and/or duration of the error. However, such an evaluation of the data can also be effected in a separate evaluation unit attached to the rail vehicle or stationarily provided outside of the rail vehicle. An evaluation logic 231 thus can in particular provide: speed calculation, direction identification, velocity calculation, mileage calculation in combination with one or more errors such as switching impact detector (for example with limit value >2.4 g), rail impact detector, flat detector, derailment detector and/or blockage detector.

Instead of the radio module 27, other interfaces can also be provided, which allow wireless or wired readout of the data of the acceleration sensor. In particular, GSM, Bluetooth, UMTS, WLAN or other radio interfaces come into consideration.

By means of a configuration stage 233, the device can be preconfigured to different situations. Further, an alarm stage 232 can be provided, which triggers an alarm upon detected errors.

It has become apparent that it is advantageous to preprocess numerous sensor data such as for example the sensor data SX, SY, SZ in the device 3, as above described, and to output or to transmit already the calculated quantities (mileage or km reading, blockage of the wheels, error codes etc.). This is in particular advantageous in connection with a telematics unit 13 (later described), which receives the data of one or more devices 3, which can be attached to several vehicle axles 2 of the rail vehicle. Accordingly, a device 3 can be associated with a shaft 2 of a rail vehicle.

The device 3 can be configured to receive and store important parameters. For example, the wheel diameter (or radius) belongs to this in order to be able to calculate the mileage. In addition, various vehicle-specific parameters such as for example noise signal level or noise signal amplitude upon blockage of the wheels or derailment, prehistory of the rail vehicle (already traveled km or year of manufacture) can advantageously be registered in the storage 24 of the device. In addition, maximum values for vertical or horizontal impacts (for example 2.4 g, wherein g is the acceleration of gravity) can be registered. Due to the parameters, the device 3 is able to autonomously calculate certain rotation-specific and error-induced quantities and to output the results. The output can be effected in the form of complete error codes and km values. According to a further aspect of the invention, the parameters and/or calculated values are protected from manipulation in the device 3. To this, encryption methods can be used.

Figure 4:
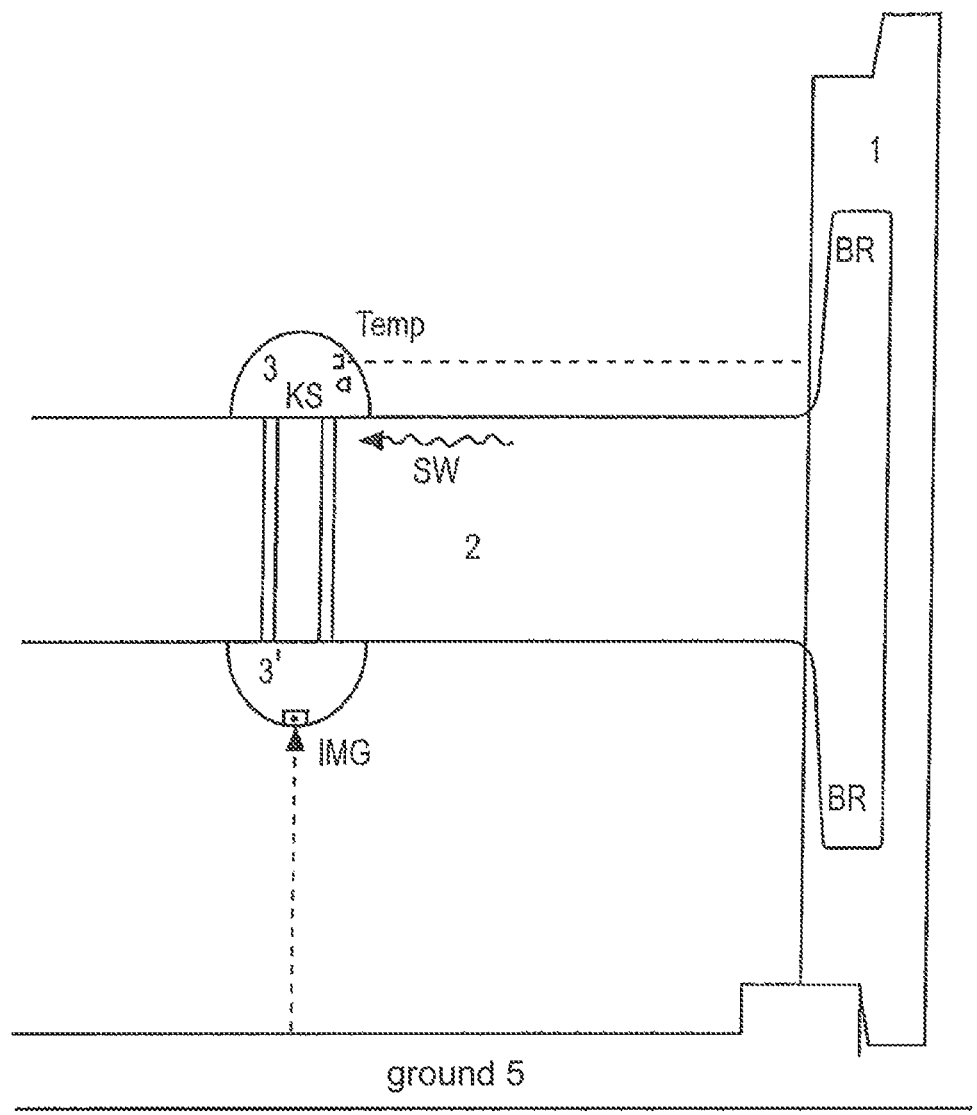
FIG. 4 shows a representation of a device on a shaft according to an embodiment of the invention.

FIG. 4 shows a section of a rail vehicle, in which temperature measurement and use of an image sensor IMG are clarified. Generally, the device 3 is disposed on the shaft 2 of the vehicle axle of a rail vehicle. It moves with the shaft 2, wherein the device 3 thereby rotates around the shaft. This rotation is effected in conformity with the rotation of the wheel 1. If a hot box occurs in the axle bearing, this is determined by means of a temperature sensor TEMP. The temperature sensor can be an infrared sensor.

Advantageously, the device 3 can also have a structure-borne sound sensor KS. It could detect sound waves SW, which are then evaluated. The actuation of the brake could then be detected in acoustic manner by the sound waves SW through the shaft, since the actuation of the brakes causes typical acoustic patterns (spectra, harmonics etc.). Other error states or error conditions could also be detected by the structure-borne sound sensor.

An image sensor IMG could also be provided in the device according to the invention on the shaft. The image sensor IMG could then receive an image or else only a brightness signal of the ground 5. Therein, it can advantageously be synchronized with the rotation movement of the shaft. This is for example accomplished by evaluation of signals of an acceleration sensor as it is described in detail herein. The image of the ground can then be evaluated to determine an absolute or else advantageously only a relative position within a known distance. To this, the image sensor can for example only detect brightness values or certain color values. The detection can always only be effected if the sensor is oriented downwards towards the ground. Thereby, energy can be saved and the location filtering can be simplified. The detected images (or else only image values, points etc.) can then be compared to known patterns in order to thus determine the position.

Other image filtering methods can advantageously use the signals of acceleration sensors as they are later described in detail.

Figure 5:
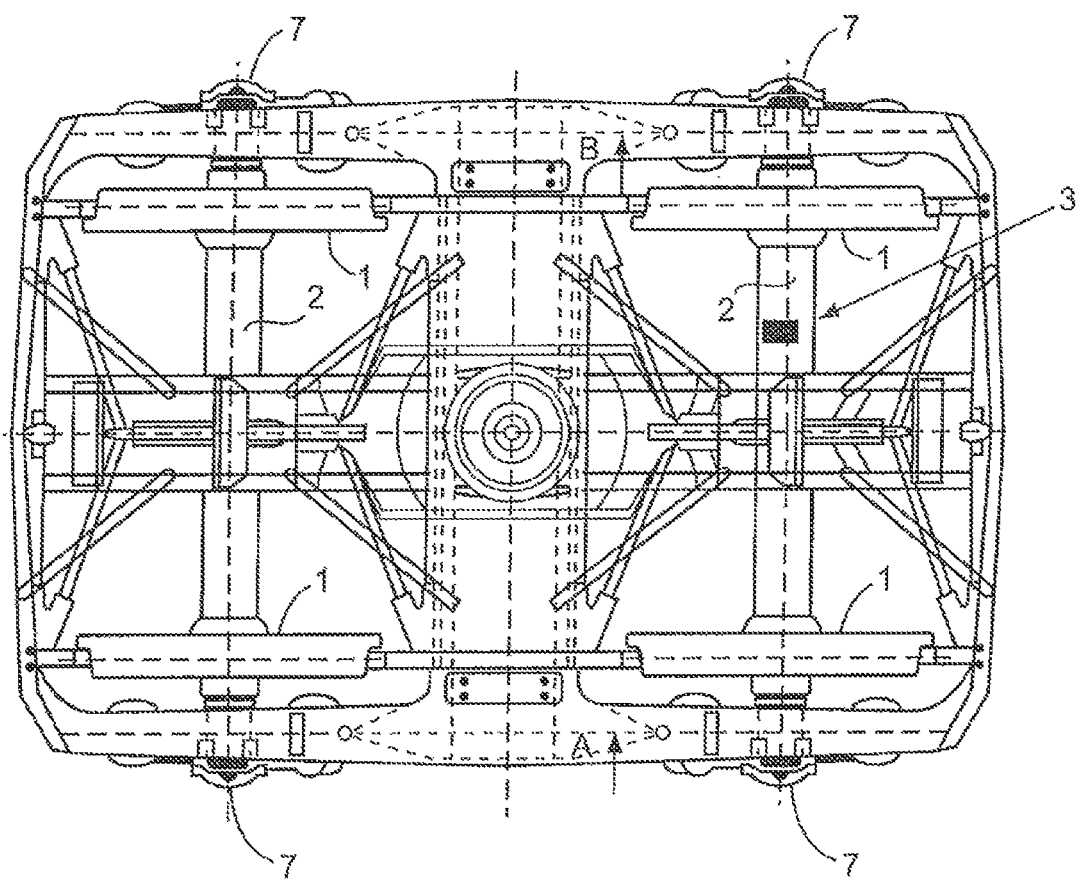
FIG. 5 shows a sectional and plan view of a bogie of a rail vehicle with a device according to aspects of the invention.

FIG. 5 shows further aspects of the invention. The device 3 according to the invention is generally disposed on a shaft of a rail vehicle according to one or more aspects of the invention. The device 3 can contain one or more of the previously and later mentioned sensors and corresponding evaluation and/or storage and/or wireless data transmission means. The device 3 is advantageously disposed in a rail vehicle with a bogie as illustrated in FIG. 5. Advantageously, the device 3 can be disposed not exactly in the middle M of the shaft 2. This offers more space upon rotation around the shaft 2. In addition, in this position, there is often advantageously line of sight to the bottom of the transport container of the rail vehicle. For example, this advantageously allows the distance measurement for determining the loading state. Devices 3 according to the invention can be disposed on one or more shafts 2 of the bogie. The spring 7 is outside of the wheels. This is advantageously exploited because thereby there is free view from the device 3 to the wheels 1. This allows other previously or later mentioned measurements with the device 3.

Figure 6:
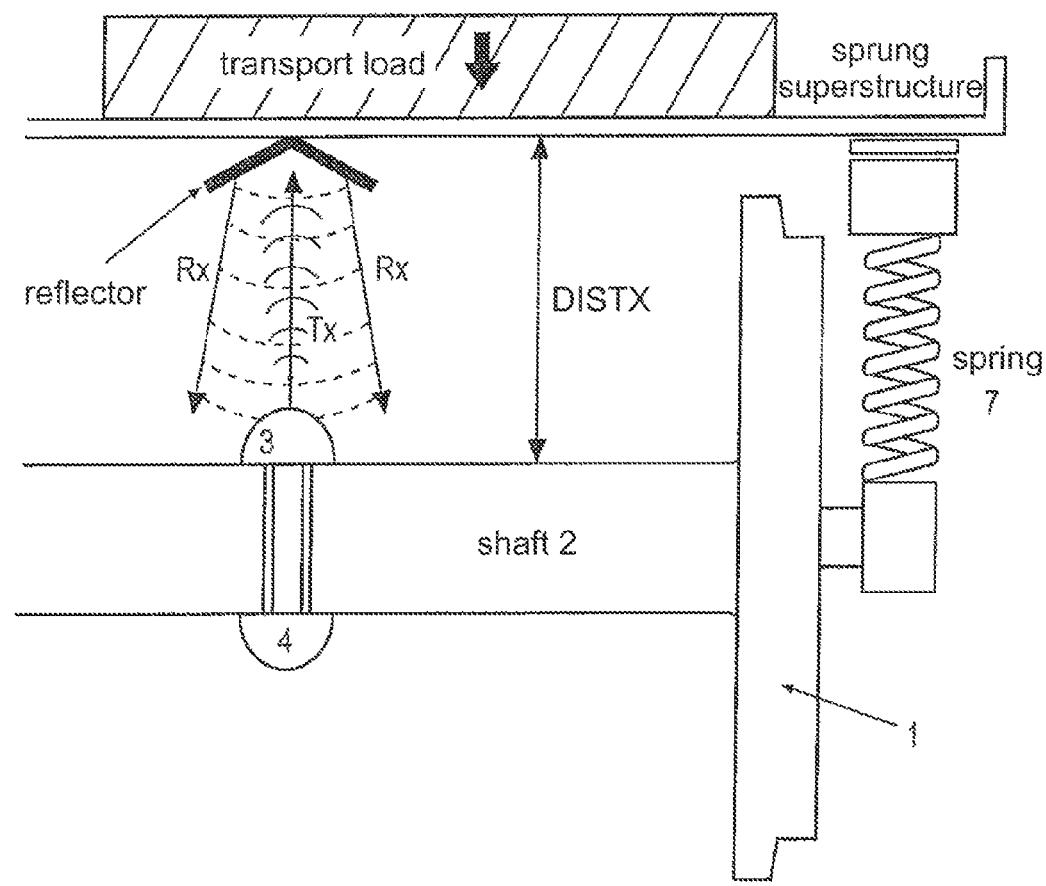
FIG. 6 shows a representation of a device on a shaft according to an embodiment of the invention.

FIG. 6 shows a further embodiment of the invention. In a further configuration, a sensor can be provided for distance measurement 258. It can advantageously be configured to determine the distance to the freight wagon bottom or other known stationary parts from the shaft. Basically, ultrasonic transmitters and receivers come into consideration, which allow distance measurement with ultrasound. However, they possibly cannot withstand the existing environmental conditions and optionally not measure sufficiently precisely upon rotation of the shaft. Therefore, advantageously, a radio-based sensor can also be provided as it is represented in FIG. 6. The transmitter disposed in the device 3 can emit pulse signals TX and measure the backscattering RX thereof. From this, the distance DISTX between the bottom of the superstructure of the rail vehicle and the shaft 2 (or the device 3) can be measured. This method operating in the manner of a radar can be advantageous over ultrasound. The distance measurement can be exploited to determine the loading state of the rail vehicle, for example of a freight wagon. Due to the spring 7 of a rail vehicle, the distance DISTX between a shaft 2 of the vehicle axle and the bottom of the superstructure decreases when the vehicle is loaded. Due to this, the distance can be used for loading measurement. Advantageously, the distance measurement can be synchronized with the rotation movement of the axle. To this, the acceleration sensors according to numerous aspects of the invention can be used. Thereby, the distance to a defined backscattering surface can be specifically determined in a certain orientation of the shaft, advantageously upwards. Here, the attachment of a radar reflector is also convenient, which generates a defined reproducible return signal. Such a reflector generates a very strong signal reflection by its shape and size adapted to the radar frequency. Thereby, the return signal can be very well differentiated from reflections of other components of the wagon bottom. Advantageously, the radar reflector can be attached to the bottom of the wagon above the shaft.

The synchronization of the distance measurement with the rotation movement of the axle moreover also results in decrease of the energy required for signal generation.

Figure 7:
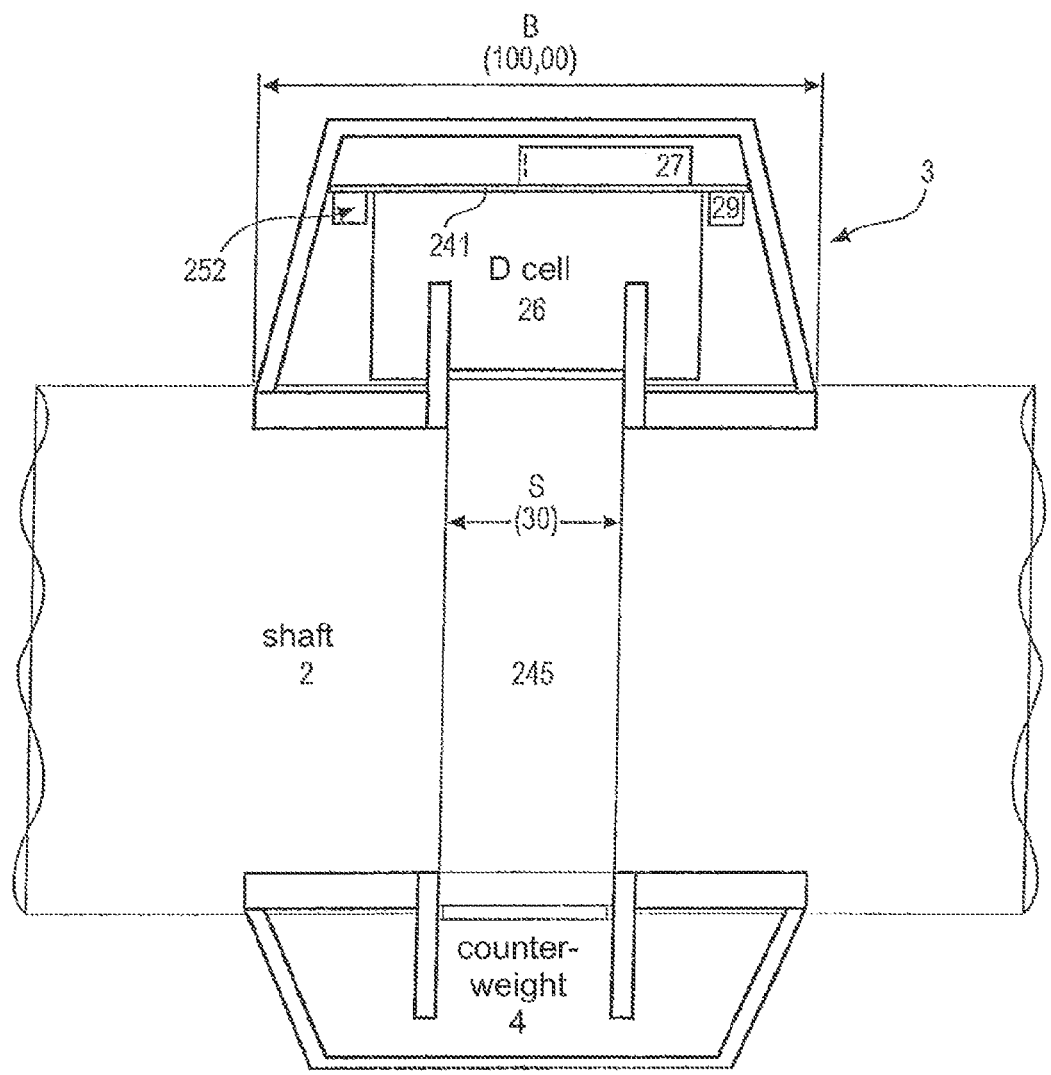
FIG. 7 shows a simplified representation of a lateral cross-section of an embodiment of the invention.

FIG. 7 shows a simplified representation of an embodiment of the invention. In this representation, the physical configuration and the attachment to the shaft 2 of a vehicle axle of a rail vehicle are in the foreground. Advantageously, the device 3 is accommodated in a robust housing. The battery 26 (here for example a D cell) is to be disposed on the shaft 2 as close as possible. The basic shape of the housing for the device 3 can be designed wider on the shaft. The mentioned aspects have advantageous effects on the appearing forces, which can become unusually high in the present application. The device 3 can be attached by means of one or more circumferential steel bands 245. This allows retrofitting with minimum expenditure of time. Advantageously, the width S of the steel band 245 can be about S=30 mm. The width B of the device 3 in axial direction of the shaft then advantageously cannot exceed 100 mm. The ratio between width S of the steel band 245 and the width B of the device 3 can be about S:B=1:3.3. On the opposing side of the shaft 2, a counterweight 4 is provided in order to balance the imbalance. In cross-section, the housings of the device 3 and of the counterweight 4 have an approximately trapezoidal profile or a wide base. A semi-circular or arched profile also comes into consideration. The avoidance of torsional forces on the sensor module 3 is important. The electronics can be attached on the exterior of the device 3. In this schematic representation, a board 241, the vibration sensor 252, a radio module 27 and an antenna 29 are shown as representatives for the entire electronics. The vibration sensor 252 and antenna 29 are located in the part of the board overlapping the battery 26, namely on the inner side (facing the shaft) of the board 241. The storage (not shown) should be a non-volatile memory (for example EEPROM). Advantageously, the device 3 can be disposed in the middle of the shaft 2 or vehicle axle.

Figure 8:
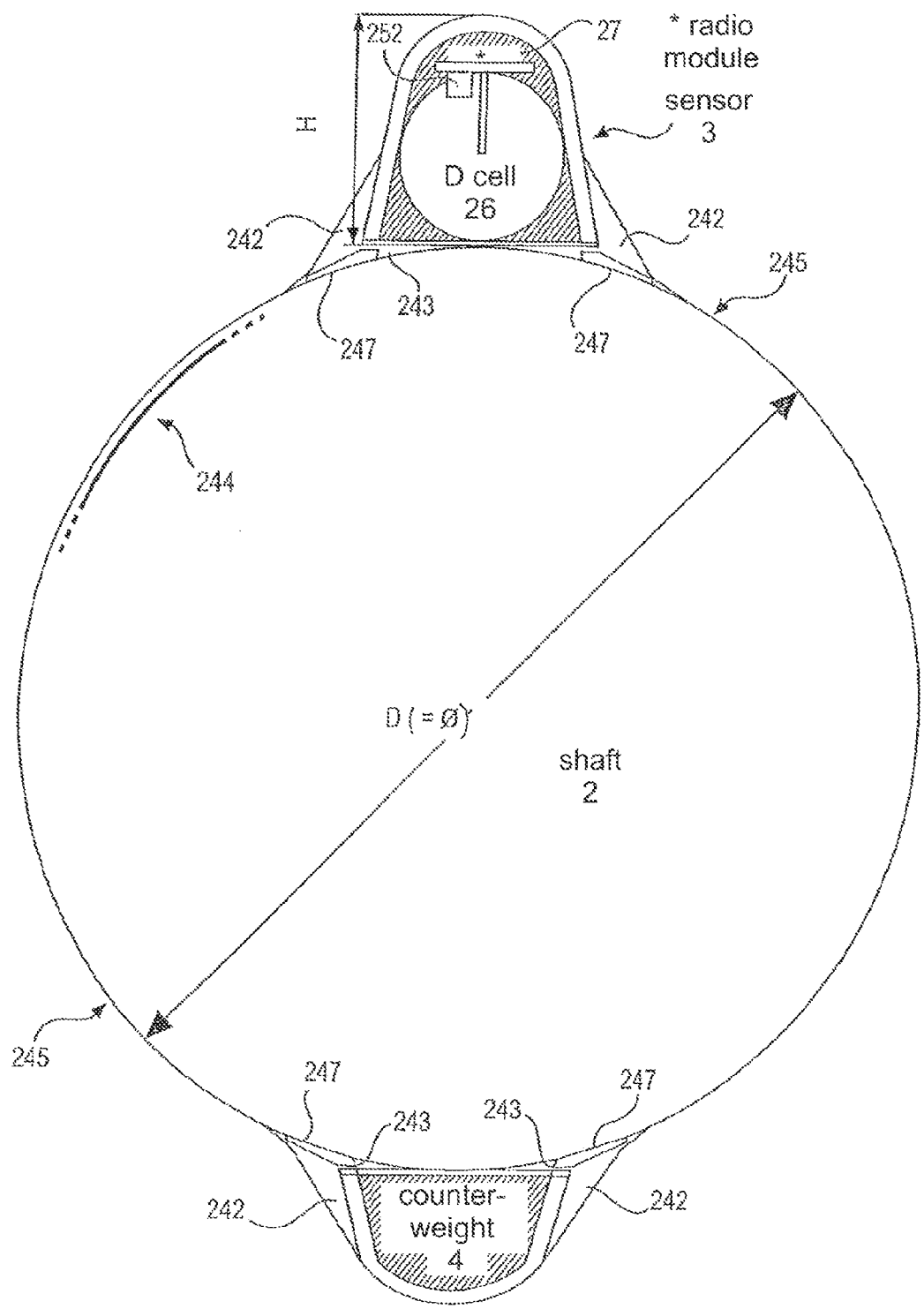
FIG. 8 shows a further view of a simplified representation of an embodiment of the invention.

FIG. 8 shows a section through the shaft 2 as well as the device 3 and the counterweight 4 to highlight further advantageous aspects of the invention. The housings for the device 3 and the counterweight 4 are rounded in circumferential direction of the shaft 2 and thereby better adapt to the shaft circumference. Reinforcement braces 242 can be provided to absorb torsional and other forces. The steel band 245 extends around the shaft 2 and through passages 243 of the housings for device 3 and counterweight 4. In the device, the battery 26, the board 241, the radio module 27 and the vibration sensor 252 are simplifying indicated. A portion of or the entire further electronics is located there as it is represented in FIG. 3. In particular, there is also the acceleration sensor 21. The height H of the device 3 can be in the range of H=45 mm. Thus, the ratio of height H to width B of the device can be approximately at H:B=1:2. The shaft can have a diameter D of 173 mm, wherein D=160 mm and optionally varying diameters also come into consideration. Therefore, the use of a steel band is advantageous, the length of which can be flexibly adjusted to accommodate different shaft diameters. By the use of a steel band and housings with passages 243, the retrofitting operation is facilitated. A displacement of the device 3 and of the counterweight 4 below the steel band is prevented by a predefined high contact pressure on the vehicle axle or shaft and advantageously by a mechanical security of the two housing parts below the steel band.

The traction between the shaft 2 and the circumferential band 245 should be selected such that notch effect on the shaft 2 does not occur. Damage to a varnish layer on the shaft 2 should also be avoided.

The dimensioning of the device with respect to the axle or shaft diameter thus can result as follows: D:B:H:S=180:100:45:30=6:3.3:1.5:1. Advantageously, it cannot be considerably departed from these values (thus respectively not more than 50% deviation), if it is aimed at attachment to the shaft 2 with a steel band in simple manner.

A further aspect is the corrosion between steel band 245 and shaft 2. It can be advantageous to provide a further layer 244 between steel band 245 and shaft 2, which is suitable for preventing corrosion. This layer 244 is only represented in illustrating manner on a piece of the circumference of the shaft 2, but would extend entirely around the shaft 2 below the steel band 245. The side of the layer 244 facing the shaft 2 could then have knobs or else a tire profile. Advantageously, it could be configured such that a secure attachment is present, however which does not entail damage to the shaft and retains as few humidity as possible. The supporting elements 247 (in the manner of feet) are inclined to accommodate the curvature of the shaft. This increases the robustness and resistance to torsional, centrifugal and acceleration forces. By the use of a plurality of inclined feet on the housing exteriors, a self-alignment of the sensor on the axle results, by which it can be ensured upon assembly that the measurement axes of the internal sensors are oriented exactly parallel or orthogonal to the shaft.

Figure 9:
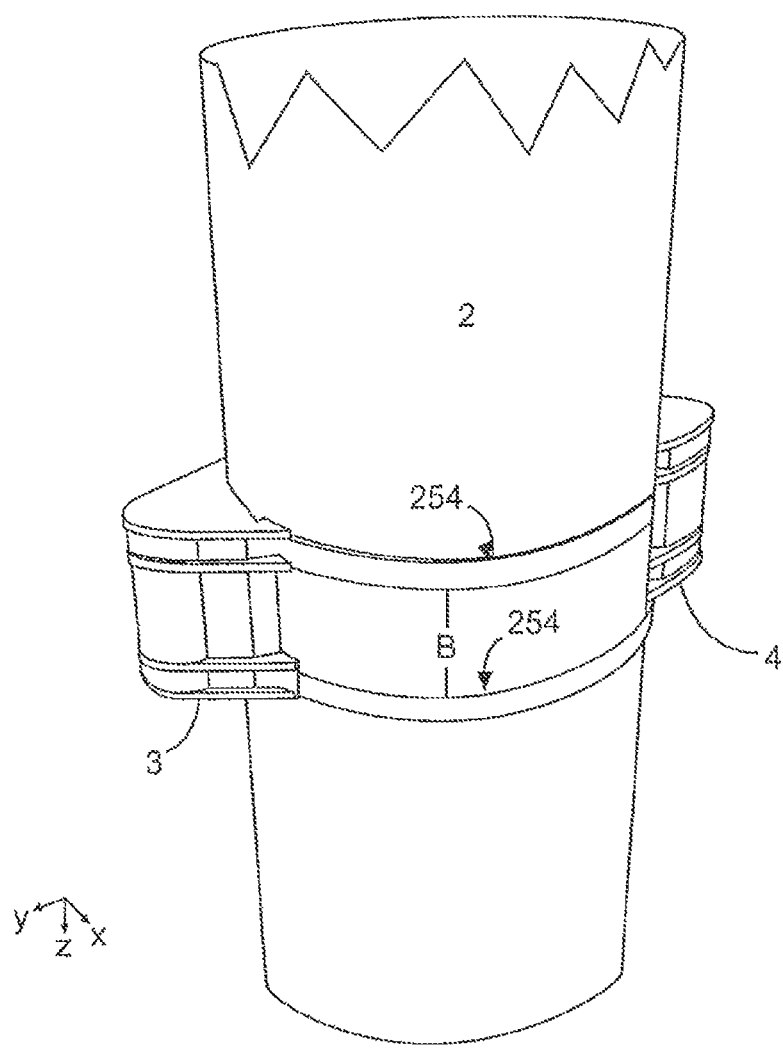
FIG. 9 shows a simplified representation of an embodiment of the invention with respect to the arrangement on the shaft of a vehicle axle of a rail vehicle.

FIG. 9 shows a perspective configuration of a further advantageous configuration of a coupling of the device 3 to a shaft 2. In this configuration, two circumferential bands (for example steel bands) 254 are employed. Hereby, the propensity to corrosion can be further reduced. Incidentally, the configuration can be similar as previously described. The size ratios can then be transferred to the two bands, wherein instead of the width S of the steel band 254 in FIG. 8, now the distance of the outer edges of the two steel bands is to be considered.

Figure 10:
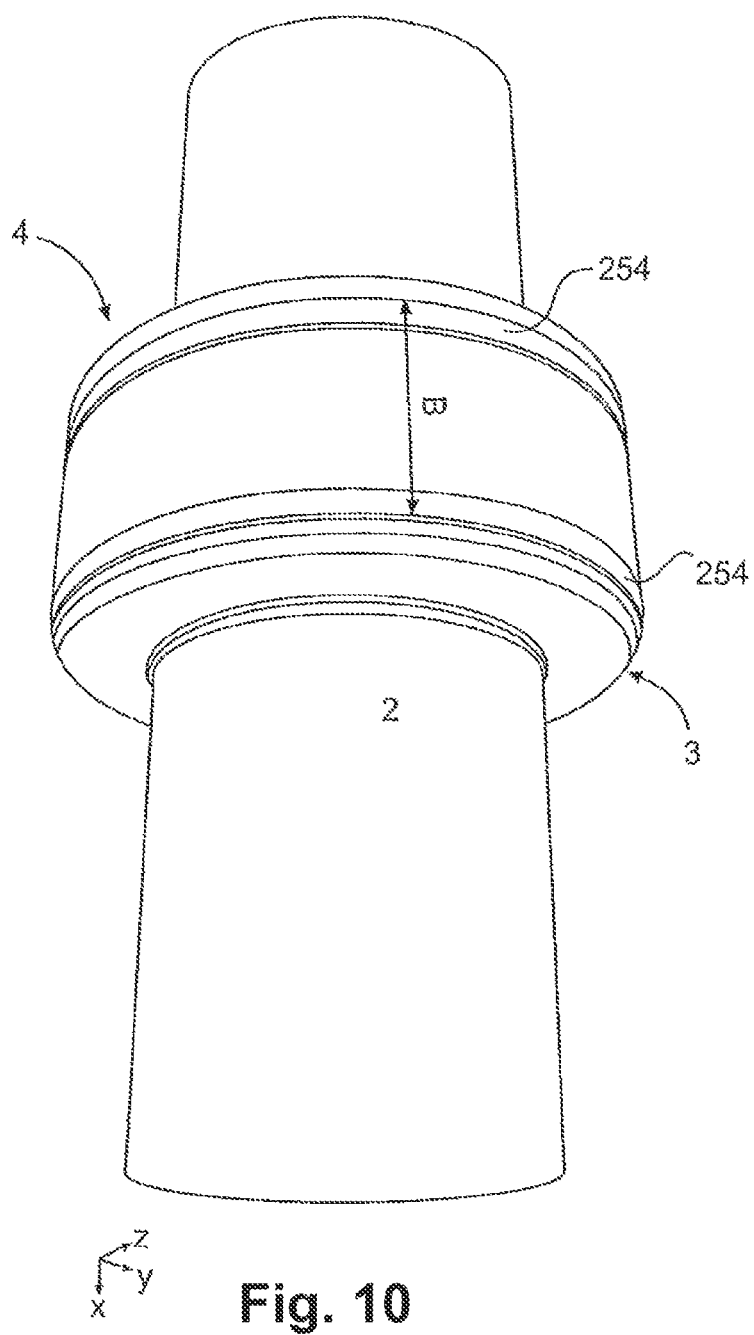
FIG. 10 shows a simplified representation of an embodiment of the invention with respect to the arrangement on the shaft of a vehicle axle of a rail vehicle.

FIG. 10 shows a perspective representation of a further advantageous configuration of a coupling of a device 3 to a shaft 2. In this embodiment, a closed circumferential sleeve is provided, in which the device 3 can be accommodated along the optional counterweight. The circumferential housing provides additional protection from rock chip, abrasion, manipulation etc. The sleeve also offers advantages with respect to the torsional forces. The steel bands 254 now extend around one-time outside of the sleeve. Here, the distance of the steel bands with respect to the above specified dimensionings is now to be considered.

Figure 11:
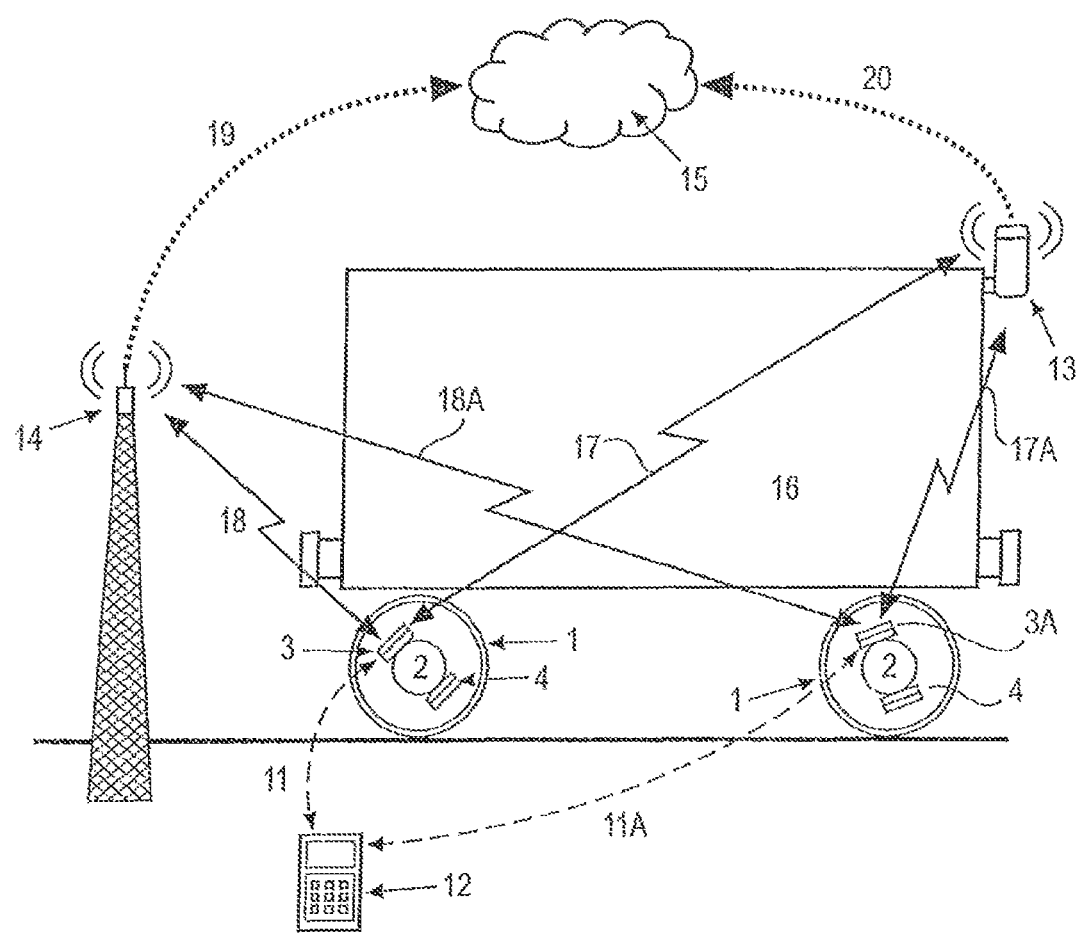
FIG. 11 shows a simplified representation of a rail vehicle with a device and a possible infrastructure according to aspects of the invention.

FIG. 11 shows a schematized side view of a rail vehicle 16 (wagon, locomotive etc.) with a device according to the invention and optional infrastructure for wireless and wired signal transmission and monitoring of the rail vehicle 16. The rail vehicle 16 has a device 2 and a counterweight 4 on a shaft 2. To this, both shown shafts 2 come into consideration. The device 3 can be configured as herein described. The data acquired and optionally preevaluated by the device 3 can be transmitted to the center 15 on different paths. An onboard telematics unit 13 with radio communication means can be disposed on the rail vehicle 16 and receive the sensor signals (for example mileage and optionally additional information or results of a preevaluation, in particular an error code, point of time of a start of movement etc.) transmitted by the device 3 via the radio link 17 and transmit it to the center 15 via a second radio link 20. The telematics unit advantageously includes a microcontroller, a radio interface, memories, modules for GPS, GSM, Bluetooth and/or UMTS, a battery and/or a vibration sensor as well as optionally numerous further sensors. Further, a stationary radio communication means 14 can receive the sensor signals via the radio link 18 and transmit them via an additional wireless or wired communication link 19 to the center 15. The radio link 18 can also operate according to usual mobile radio standards (for example GSM or UMTS). The data can be centrally acquired and evaluated in the center 15. As a further option, the data can be received by a mobile apparatus 12 via a wireless or wired communication link 11. Parameters can also be set and changed in the device 3 via the communication links 17, 18 and 11. Although stronger reflections can occur on the rail vehicle than with lower frequencies, the radio link 17 advantageously can use a high frequency range of 868 MHz or 2.4 GHz. Surprisingly, this has proven to be convenient even with regard to a complex infrastructure and complex readout and monitoring scenarios of numerous devices 3. The use of a lower radio frequency specially approved for the railway operation would be advantageous with respect to the propagation conditions of the waves in the freight wagon environment and possible disturbances by public users.

According to an advantageous aspect of the invention, is it provided not only one device 3 on a shaft of a vehicle axle of the rail vehicle 16, but a plurality of separate devices 3, 3A etc. on each shaft or vehicle axle 2. According to this aspect of the invention, the devices 3, 3A are not only associated with the rail vehicle 16, but actually with the corresponding shaft or vehicle axle 2. Correspondingly, the telematics unit 13 can communicate with both devices 3 and 3A. The radio link 17A exists to the device 3A. The mobile apparatus 12 can also make contact with the device 3A via the radio link 11A. This finally also applies to the stationary radio communication means 14, which communicates with the second device via the radio link 18A. Each device 3 and 3A can be configured as herein described. Advantageously, the telematics unit 13 for example can now differentiate between the devices 3 and 3A and thereby determine which signals (start of movement, mileage, velocity, rotational direction, blockage of the wheels, brake activity etc.) originate from which vehicle axle 2.

The mileage of the freight wagon can for example be derived in the telematics unit 13 from the increment of the individual mileages. The examination of the mileage and error history of the individual vehicle axles 2 is particularly advantageous because the vehicle axles 2 can be individually replaced. Therefore, these vehicle axles 2 can have mileages and error histories different from the vehicle. With regard to the safety and reliability of the rail vehicle, this information is of great importance. In the case of error, the telematics unit can transmit an alarm signal to the center via radio. Thus, errors can be quickly discovered and optionally also corrected. In order to allow the association with vehicle axles 2 and rail vehicles 16, a coding can be provided in the device. It can be unique and unchangeable.

The mobile apparatus 12 can be configured to read out a device 3, 3A as soon as it is close to the device 3, 3A to be read out. To this, the reed sensor 251 (cf. FIG. 3) can be excited by means of a magnet and thereupon the device, which is to be read out, can be activated.

The telematics unit 13 can be configured to examine the position and for example the velocity or also the direction of movement of the rail vehicle by means of GPS. This can be effected from time to time to perform a plausibility check on the data provided by the devices 3, 3A. In particular in order to match the velocity signals transmitted by the sensors to the current GPS velocity. In addition, in the case of error (for example message: wheel blockage from a device), it can also be examined if the rail vehicle really does not move. In addition, it can optionally be located. The telematics unit 13 too can advantageously possess a vibration sensor, which provides that the telematics unit 13 is only activated if the rail vehicle moves. The autonomous runtime of the telematics unit advantageously is up to 6 or 7 years.

With a device 3 or 3A according to the present invention, the rotation movement detection and chassis diagnosis are possible by means of a compact, integral and self-contained unit, which can be simply retrofitted.

The telematics unit 13 can query the devices 3, 3A in regular intervals instead of waiting for transmissions of the devices. In another advantageous configuration, the telematics unit 13 and devices 3, 3A each can possess real-time clocks and synchronize via them. Then, certain points of time can be provided for transmission. For the case of error (blockage, derailment), transmissions outside of the defined time intervals can also be provided, e.g. after the simultaneous response of the vibration sensors 252 in the devices and in the telematics unit 13 after a preceding standstill time.

Figure 12:
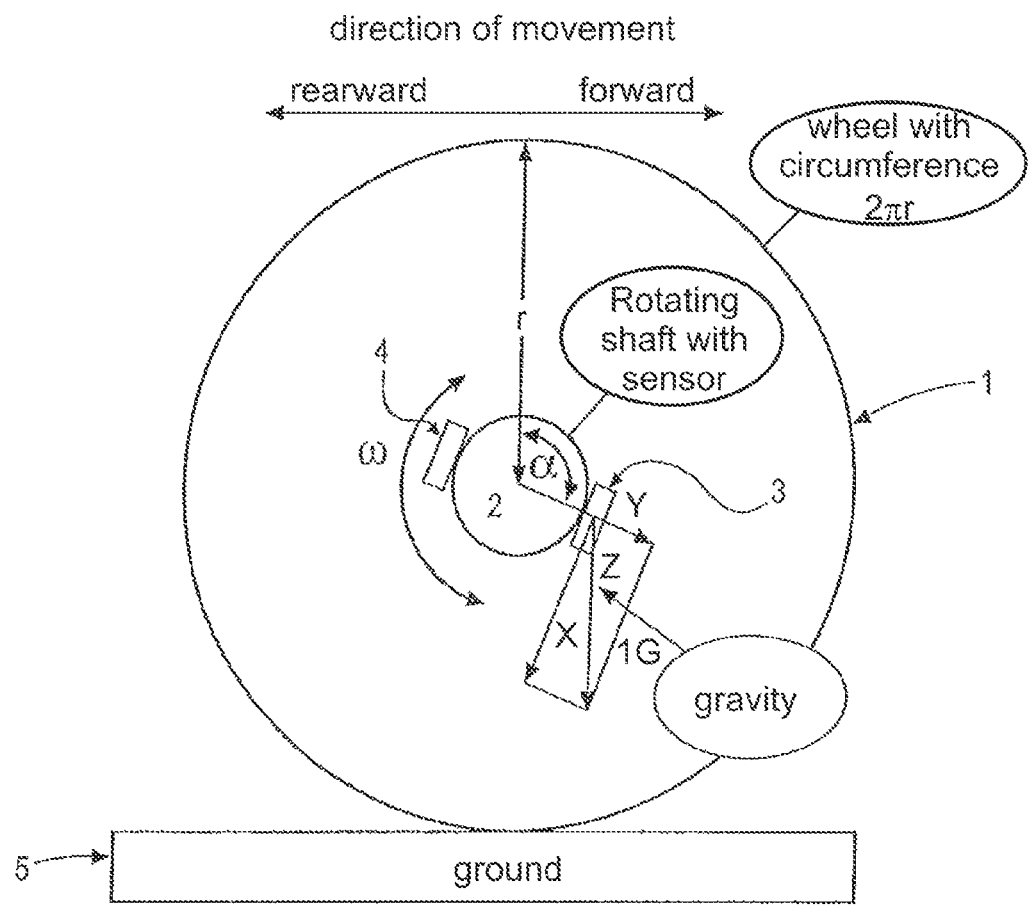
FIG. 12 shows a representation of an embodiment with respect to an acceleration sensor.

FIG. 12 shows a simplified representation of a section of an embodiment of a device according to the invention. A wheel 1, for example of a rail vehicle (not shown) is represented. A vehicle axle or the shaft of a vehicle axle 2 (afterwards often simplifying only referred to as shaft) is attached to the wheel 1, which protrudes into the image plane such that only its cross-sectional area is illustrated. Typically, the shaft 2 can connect two similar wheels 1 of the rail vehicle. A unit 3 is disposed on the shaft 2, which includes at least one movement sensor, which can determine a static acceleration in at least one axis (direction). On the opposing side of the unit 3, a counterweight 4 is disposed to avoid imbalance. The wheel 1 rolls over the ground 5, which can for example be a rail, in a forward or rearward movement of the rail vehicle. The axial directions, in which the acceleration sensor can determine the acceleration, are identified by an X-, Y- and Z-axis. The X-, Y- and Z-axis are each orthogonal to each other. In addition, the direction of the earth's gravity or of the gravitational field/acceleration of gravity is represented by an arrow 1G. The X-axis points in the tangential direction with respect to the circumference of the cross-section of the shaft 2, the Z-axis points in the radial direction viewed from the center of the shaft 2, and the Y-axis points in the axial direction of the shaft 2, thus out of the image plane. In the unit 3, a microprocessor, a memory, in particular semiconductor memory, and a radio module for transmission of data can be provided besides the acceleration sensor. Insofar, a partial or complete preprocessing of the signals determined with the acceleration sensor can already be effected within the unit 3. Instead of a radio module, another interface can also be provided, via which data can be wirelessly or wired read out from the unit 3. A direction of rotation of the vehicle axle or shaft is indicated together with the angular velocity ω. Similarly, an angle of rotation a with respect to the acceleration of gravity is indicated. The angle of rotation a of the shaft 2 can be captured by the movement sensor. In the specific application, thus, the speed, the angle of rotation and/or the inclination of the shaft 2, possibly occurring irregularities on the rotating assembly, irregularities on the ground and impacts by other objects can be captured. Based on the sensor signals, then, the traveled distance (mileage), standstill, blockage of the wheels, velocity, abnormal operational states (wear, derailment), track damages, switching impacts and operating duration can be determined among other things. The acceleration sensor measures the acceleration of gravity acting on the axle and on the sensor among other things. An axle or shaft 2 rotating in the gravitational field of the earth generates, as far as it is not at an 90° angle to the earth's surface, a periodic signal of the X- and Z-axis sensor depending on the varying angle of rotation of the shaft 2. The frequency of the signal corresponds to the speed of the axle. In the center of the present invention, there is the evaluation of the temporal course of the sensor signals for determining the mileage or the travel velocity and the detection of specific disturbances by an automated evaluation.

Figure 13:
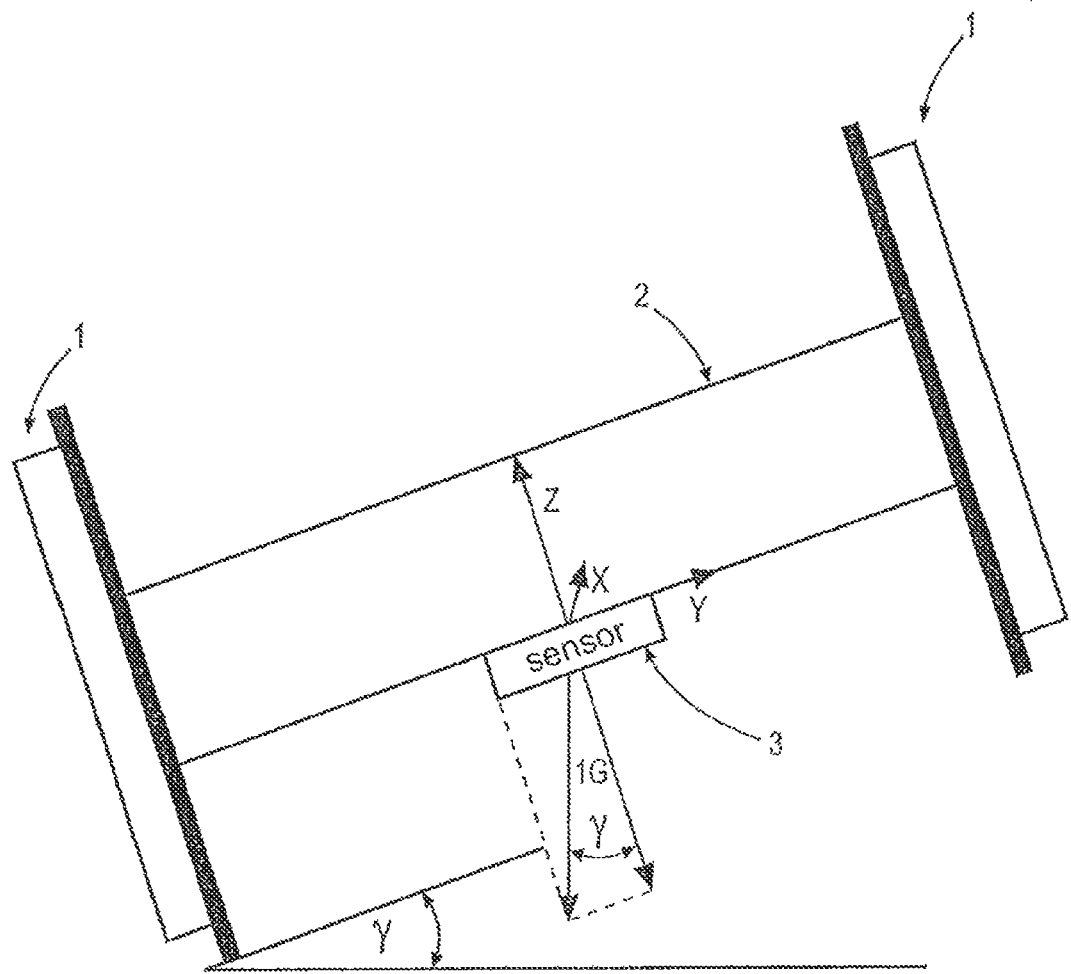
FIG. 13 shows a representation of an embodiment with respect to an acceleration sensor.

FIG. 13 shows a further simplified representation of the embodiment according to FIG. 12. The wheels 1 and a shaft 2 of a rail vehicle are represented, on which an inventive device according to an embodiment of the invention is disposed. In particular, the unit 3 can be seen, which, as above explained, can also include further electronic components for preprocessing and transmitting the data besides the acceleration sensor. Based on the figures, the position of the axial axes, in which the acceleration sensor can determine the acceleration, appears once again. The Y-axis points in the axial direction of the shaft 2. It allows a determination of the inclination of the shaft 2 with respect to the horizontal. The X-axis points in the radial direction of the shaft, thus in or opposite to the direction of rotation of the shaft. The Z-axis extends in radial direction. The angle of inclination is γ. Thus, an evaluation unit according to the invention can be set to also determine the inclination of the rail vehicle.

The FIGS. 14 to 20 show sensor signals SX and SZ for the axial directions X and Z, as they appear in a device 3 according to aspects of the invention and can be forwarded to the evaluation unit or a microcontroller. Based on the input signals, the evaluation unit 23 or else the units 13, 14 or 15 according to FIG. 11 can provide certain output signals or measurement results. To this, the evaluation unit 23 or else the units 13, 14 or 15 are set to evaluate the temporal course of the sensor signals SX, SZ (or else of a third signal SY along a third axis with respect to the inclination of the vehicle axle, shaft 2) and to calculate mileage and/or velocity therefrom and optionally detect error signals.

Figure 14:
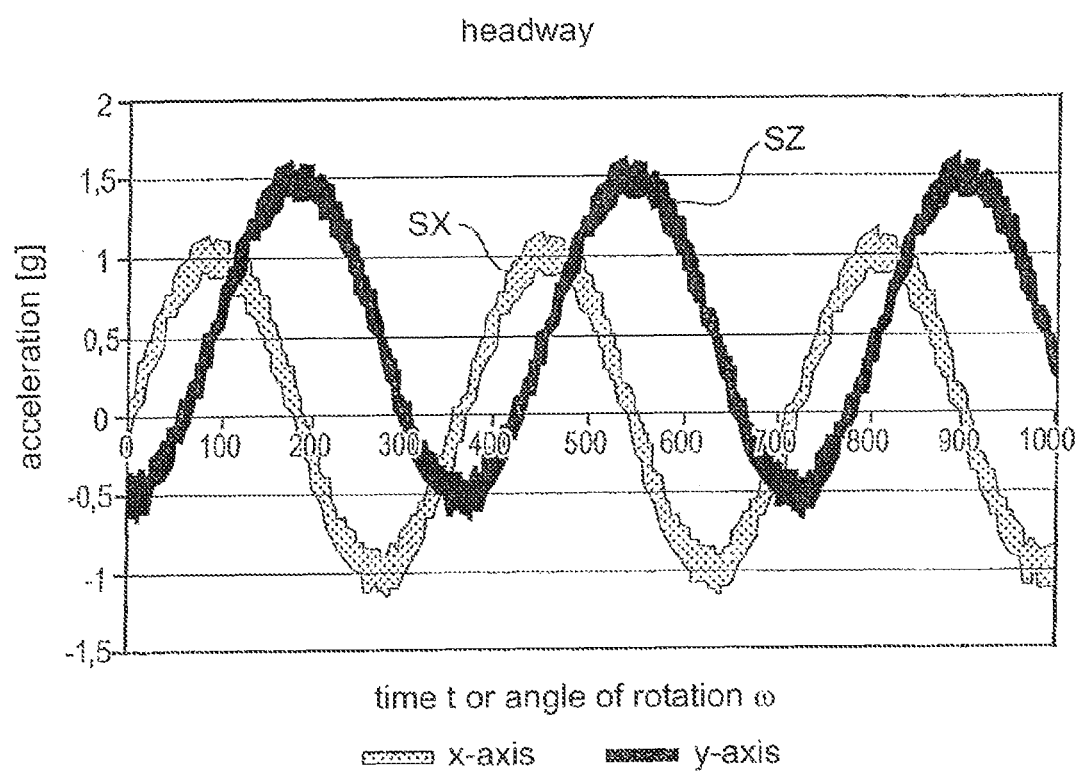
FIG. 14 shows a diagram with exemplary temporal courses of two signals of an acceleration sensor in a device according to the invention with continuous headway of the vehicle.

FIG. 14 shows a diagram of a section with exemplary temporal courses of two signals SX, SZ of an acceleration sensor of a device 3 (as previously described) with continuous headway of the vehicle. The temporal course or course related to the angle of rotation ω of output signals SX, SZ of an acceleration sensor, which can be coupled to the vehicle axle 2 of a rail vehicle according to the invention is represented. FIG. 14 relates to a continuous headway and reproduces the output signals SX, SZ associated with the X-axis (SX) and the Z-axis (SZ). They are periodic sinusoidal signals superimposed with slight disturbances. The signal SZ corresponding to the Z-axis has an offset depending on velocity with respect to the signal SX associated with the X-axis, here exemplarily about 0.5 g (g is the acceleration of gravity). The direction of the rotation movement can be extracted from the phase shift of the signal SX associated with the X-axis with respect to the signal SZ associated with the Z-axis. In the present case, a headway is represented.

Figure 15:
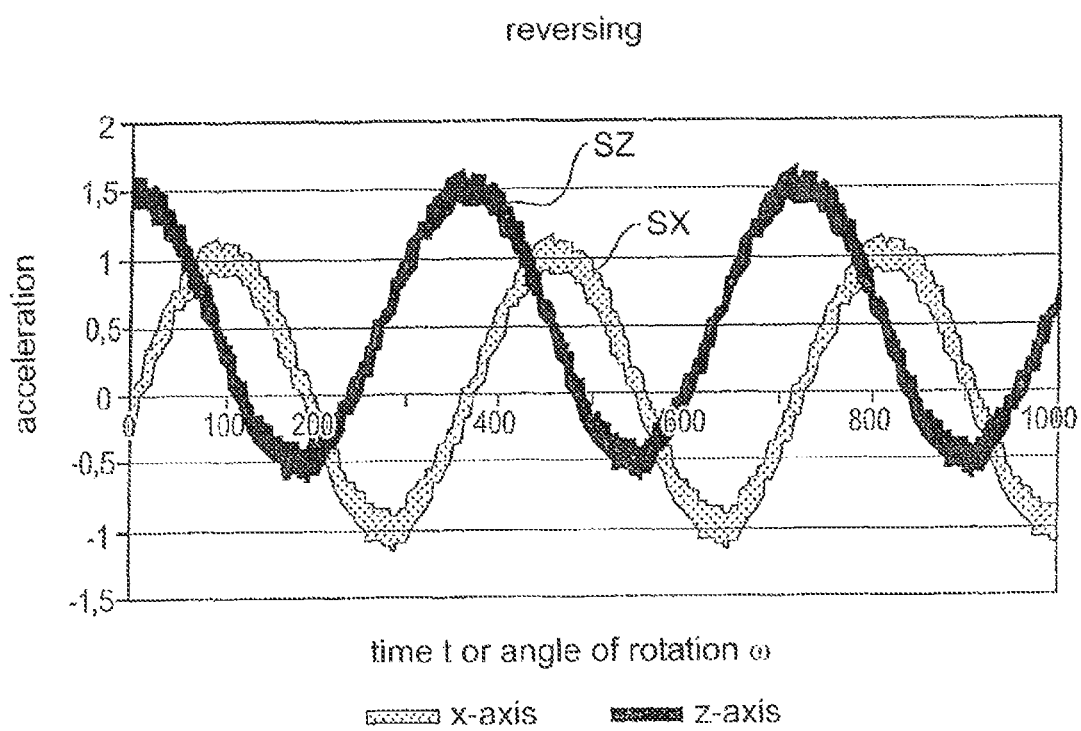
FIG. 15 shows a diagram with exemplary temporal courses of two signals of an acceleration sensor in a device according to the invention with continuous reversing.
Figure 16:
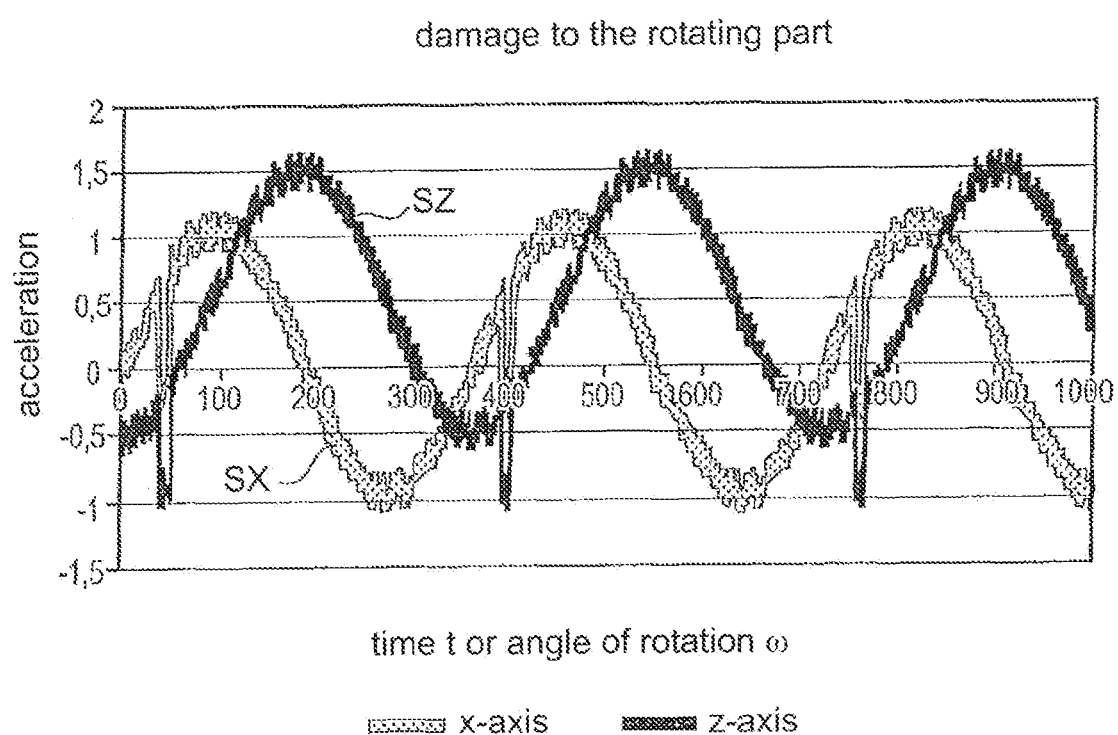
FIG. 16 shows a diagram with exemplary temporal courses of two signals of an acceleration sensor in a device according to the invention with continuous headway and an exemplary disturbance on wheel or bearing.
Figure 17:
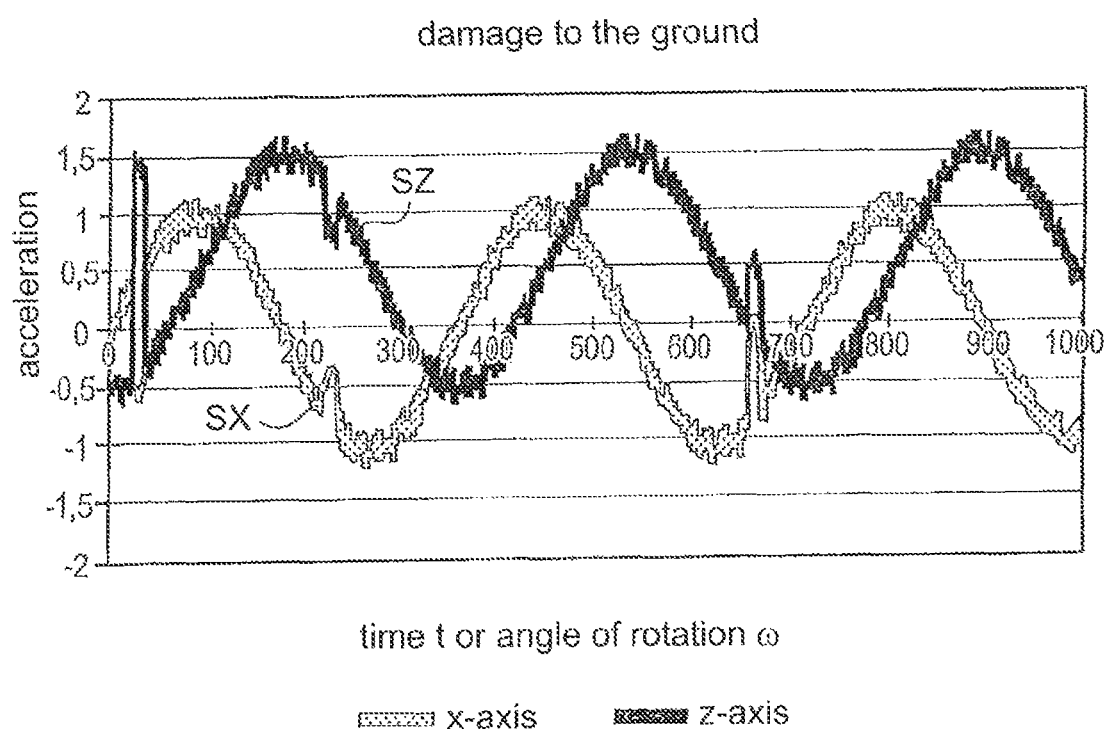
FIG. 17 shows a diagram with exemplary temporal courses of two signals of an acceleration sensor in a device according to the invention with continuous headway and an exemplary disturbance on the ground.

FIG. 15 shows the signals according to FIG. 14, wherein FIG. 15 now relates to reversing. Correspondingly, the signal SZ associated with the Z-axis leads the signal SX of the X-axis. With equal velocity of the rail vehicle, however, the period or frequency of the signals remains constant. From the maxima of the signals, therefore, the velocity and from the temporal overall course of the signals (or even only one of the signals) the completed mileage can be determined in an electronic evaluation.

FIG. 16 again shows a representation corresponding to FIG. 14, wherein a damage to a rotating part is present, such that peaks appear proportionally in both signals SX, SZ in periodic distances. Such peaks (glitches or the like) can be determined within the scope of an evaluation, which is set to the identification of this disturbance. The periodicity gives indication that the damage to a rotating part, e.g. flats, or defects on the bearing or running surfaces are present. In addition, the exact position of the damage can be inferred from the sensor signals SX, SZ. The evaluation unit (for example unit 23 or else one of the units 12, 13, 14 or 15) can be set to derive the specific position of the damage on the wheel from the sensor signals SX, SZ. From the vectorial resultant of the acceleration values SX and SZ, in particular the direction of impacts or acceleration values can be determined. Therefore, by means of a device according to the invention, it can also be differentiated between vertical and horizontal impacts. Considering the direction of the resulting acceleration values, different signal or error types (bearing damages, switching impacts, loading etc.) can be differentiated, as further explained below.

FIG. 17 again shows the signals SX, SZ according to FIG. 14, wherein a damage to the ground such as on the rail now is present. Herein, acceleration values (outliers, glitches etc.) proportionally appear singularly in vertical direction in both axes. An automatic evaluation thus can be set such that singular glitches or outliers in vertical direction are evaluated and output as ground damage.

Figure 18:
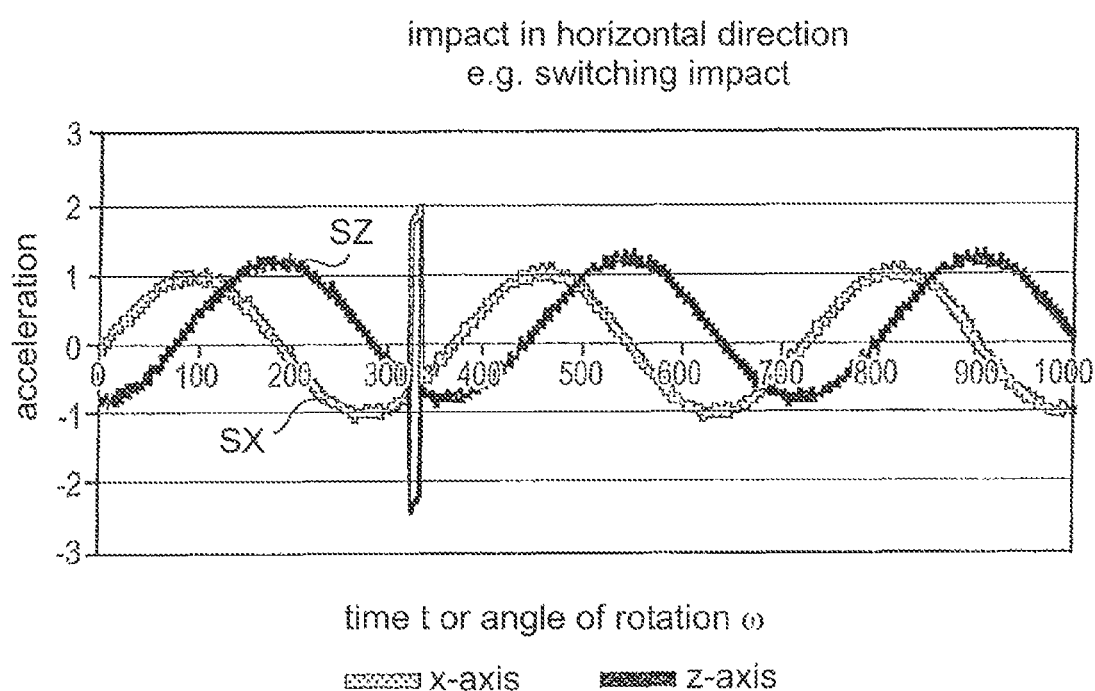
FIG. 18 shows a diagram with exemplary temporal courses of two signals of an acceleration sensor in a device according to the invention with continuous headway and an impact in horizontal direction.

FIG. 18 shows the signals SX, SZ according to FIG. 14 in an impact in longitudinal direction, e.g. in switching. Herein, acceleration values (outliers, glitches etc.) proportionally occur singularly in horizontal direction in both axes. An automatic evaluation can thus be set such that the glitches of the signals are identified as a longitudinal or switching impact. In particular, impacts above 2.4 g in horizontal direction can be detected and output as an error optionally with point of time.

Figure 19:
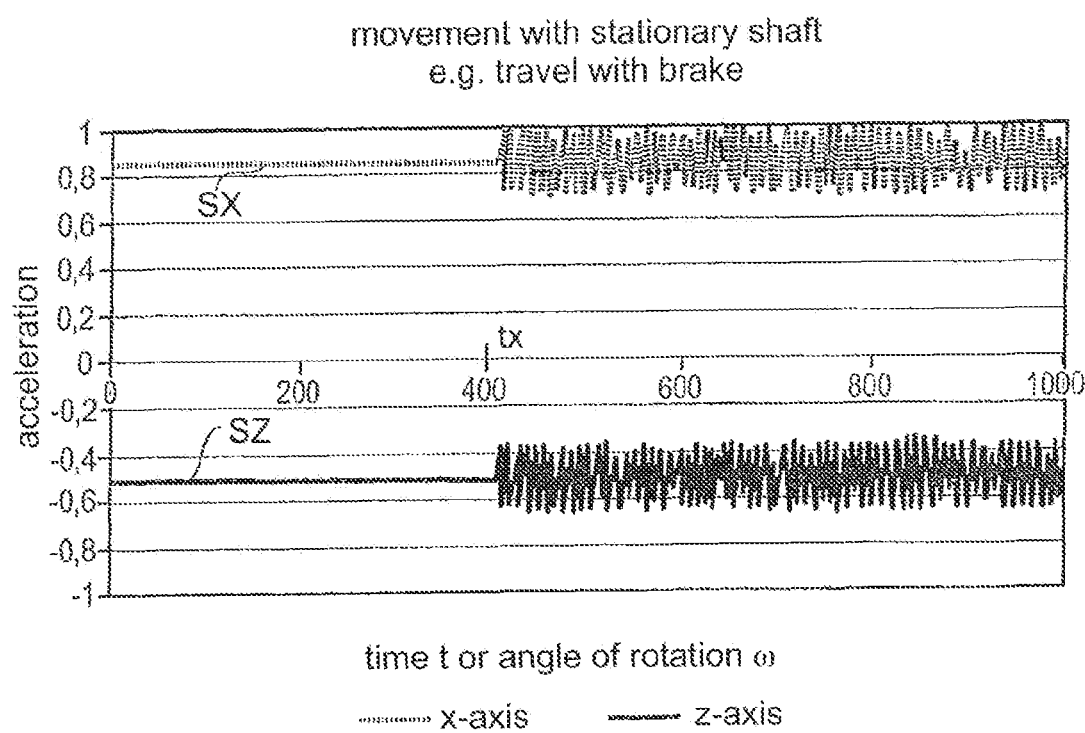
FIG. 19 shows a diagram with exemplary temporal courses of two signals of an acceleration sensor in a device according to the invention with blocked shaft.

FIG. 19 relates to a case, in which the rail vehicle is moved from a point of time tx, but the wheels are blocked. The output signals SX, SZ show non-periodic acceleration values (increased noise by vibrations) from the point of time tx, without a periodic signal (i.e. that the axle rotates) being measured in the meantime. The occurrence of increased noise with absence of the periodic sinusoidal signal depending on angle of rotation at the same time thus can be identified as blockage of the wheels. The evaluation can then store these signals for example with the point of time of occurrence and the duration of occurrence.

Figure 20:
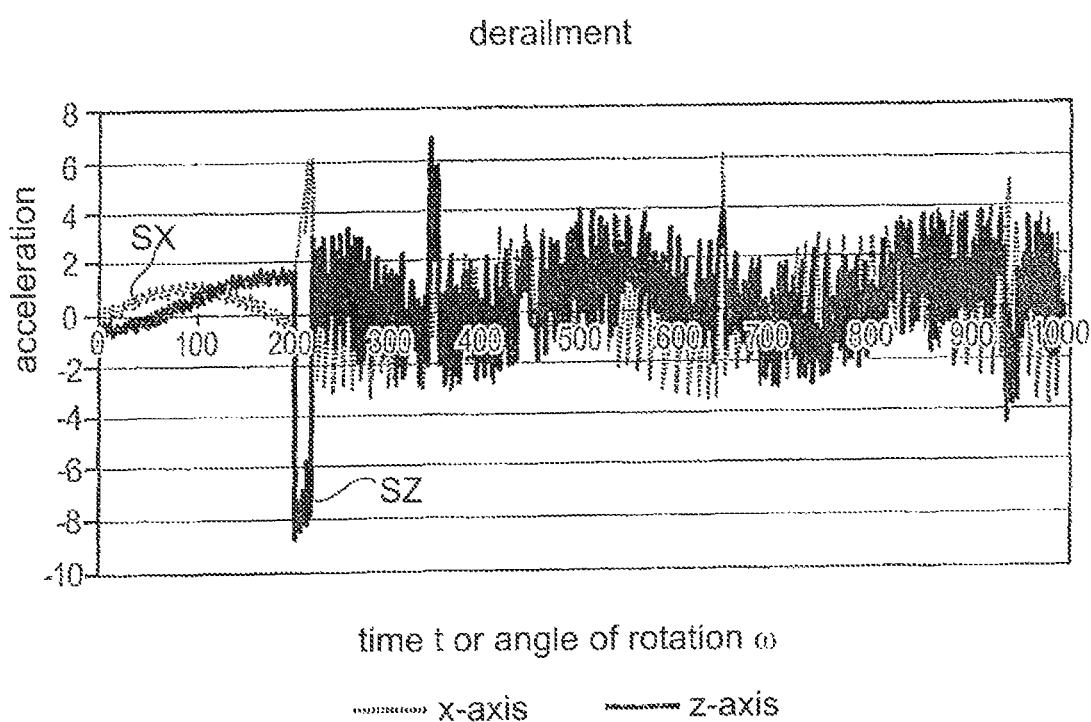
FIG. 20 shows a diagram with exemplary temporal courses of two signals of an acceleration sensor in a device according to the invention upon derailment.

FIG. 20 finally shows the possible course of acceleration signals SX, SZ upon derailment or a permanent loss of the wheel-rail contact. Herein, a continuous superposition of the sinusoidal signal with disturbance values in all axes partially with periodically recurring signature in vertical direction with constant distance of time is determined. An automatic identification of these signals thus would be possible based on the mentioned features and could be identified in a correspondingly set evaluation unit. Optionally, an alarm signal could be triggered or at least the point of time could be fixed.

According to a further aspect of the present invention, the speed of the vehicle axle 2 can also be determined or verified based on the centrifugal force, thus the acceleration measured in radial direction (Z-axis). This component is a constant signal as far as the velocity remains constant. An evaluation unit according to the invention is then configured such that it performs the matching to this signal.

According to a specific configuration of the invention, certain specific simple error codes can be associated with the errors or states. For example, the following coding is advantageous:

TABLE 1

| Code | Description |
| --- | --- |
| 0x01 NN NN NN NN | Blockage |
| 0x02 NN NN NN NN | Derailment |
| 0x03 NN NN NN NN | Horizontal impact > 2.4 g |
| 0x04 NN NN NN NN | Damage to the rotating part |
| 0x05 NN NN NN NN | Damage to the ground |
| 0xF1 NN NN NN NN | Mileage (km reading) |
| 0xF2 NN NN NN NN | Velocity |
| 0xF3 NN NN NN NN | Hot box |
| 0xF4 NN NN NN NN | Defective brake action |
| 0xF5 NN NN NN NN | Brake applied |
| 0xF6 NN NN NN NN | Loading/mass |

The codes can be simple numeric codings of the error state. For transmission, a preamble with specific data (for example ID) of the device and encryption parameters can be prepended. 'NN NN NN NN' is 4-byte payload. Besides the kilometer reading or the indicated useful value, it can also include a time stamp of the real-time clock. The shown table 1 exemplifies some advantageous examples without claim to completeness. Advantageously, the time stamp can be used for determining the wagon sequence. The states can relate to the actuation of the brake, which for example relies on the evaluation of signals of the structure-borne sound sensor. Similarly, signals of a temperature sensor can be determined for detecting a hot box. Impacts can be determined by the acceleration sensors. Some states or errors are determined from combinations of sensor signals. For example the acceleration or velocity variation with respect to a brake application, thus structure-borne sound. Similarly, this can apply to the temperature sensor.

According to aspects of the present invention, thus, a one, two or three-axis acceleration sensor is attached to the vehicle axle or shaft of a vehicle, in particular rail vehicle, which measures the appearing acceleration values in direction of the X-, Y- and Z-axis. The acceleration sensor is fixedly connected to the axle and rotates with the axle around the axle center. Among other things, the acceleration sensor measures the acceleration of gravity acting on the axle and on the sensor. An axle rotating in the gravitational field of the earth generates, as far as it is not at an 90° angle to the earth's surface, a periodic signal of the X- and Z-axis sensor depending on the varying angle of rotation of the axle. The frequency of the signal corresponds to the speed of the axle. At the same time, at least one error signal can be detected. These signals can be related to a vehicle axle of a rail vehicle.

Figure 21:
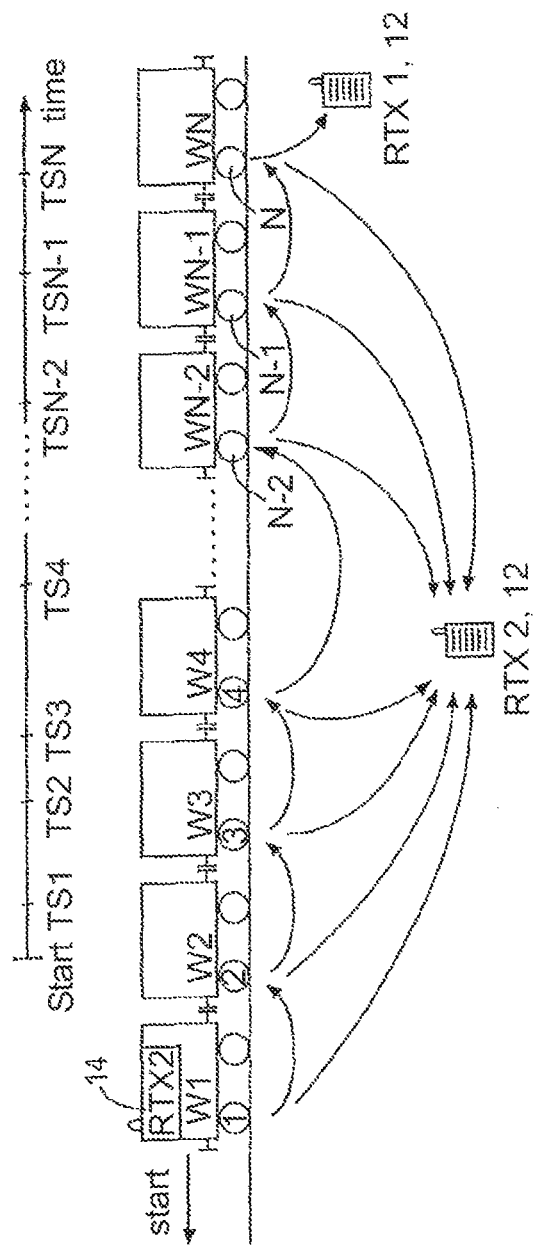
FIG. 21 shows a simplified representation of aspects of the invention concerning the determination of the wagon sequence of a rail vehicle.

FIG. 21 illustrates an embodiment of the invention with respect to the train composition and wagon sequence.

Here, a rail vehicle is a train with N wagons. The first wagon W1 can be a locomotive or a simple wagon as here represented. The train with the wagons W1, W2, W3, W4, WN−1, WN−1, WN begins to move to the left at the point of time 0. The wagon W1 begins to move at the point of time TS1 (time stamp TS1). The wagon W2 begins with the movement only at the point of time TS2, because a coupling with some backlash or spring is provided between W2 and W1. Thereby, a delay $\Delta T=TS2-TS1$ between the starting points of time of the wagons is caused. The third wagon W3 starts correspondingly only at the point of time TS3, the fourth wagon W4 at the point of time TS4, the N−2-th wagon WN−2 only at the point of time TSN−2, the N−1-th wagon WN−1 at the point of time TSN−1 and the last wagon WN at the point of time TSN. The time delays between respectively adjacent wagons do not have to be of equal length in pairs. Nevertheless, the condition $TSi<TSj$ for $i<j$ always applies, wherein i, j are natural numbers. Thereby, the order of the wagons can be determined, since from the point of view of the first moving wagon Wi, there always applies: $POSi<POSj$ for $i<j$, with i, j as previously defined. A smaller i, j then means a position closer to the forefront of the train, at which the locomotive is located. In a pure pushing movement, the correlations are of course exactly reversed.

The motion detection is effected with the employment of a device 3 attached to a shaft 2 of the wagons W1 to WN in the previously described manner. The wagons W1 to WN can have a device 3 on each shaft 2 of their vehicle axles or only on one shaft 2. This is indicated by the numbering 1 to N on the wheels. Advantageously, the device 3 can have a rotation or movement sensor according to the above aspects and embodiments, in particular an acceleration sensor.

According to this aspect of the invention, the following relation can generally be used:

$$POSX=F(TSX),$$

wherein POSX is the relative position of a rail vehicle (i.e. of a wagon within a train) and TSX is the relative or absolute starting time of the rail vehicle (i.e. of the wagon X within the train).

Advantageously, an identification signature IDX of the wagon X enters the function, whereby the following relation results:

$$POSX=F(TSX,IDX).$$

This ID can be stored in the device 3. In an embodiment, it can be the identification number IDWX of a shaft, which can be expressed as follows:

$$POSX=F(TSX,IDWX).$$

Thereby, this ID can also be used for identification of the wagon. Then, it can be a unique and only one-time assigned number, which is associated with a single shaft. In another embodiment, identification numbers IDX can be assigned to wagons, which can then also be stored in the device in the shaft. Advantageously, it can be a read-only memory, which stores the number. The values IDX or else IDWX advantageously can be protected from inadmissible subsequent manipulation.

According to an aspect of the invention, the devices 3 on the shafts 1 to N of the wagons W1 to WN can also communicate with each other or at least transmit data from one to the next device. Preferably, this can occur in that the devices 3 are configured to establish an ad-hoc network. This network can spontaneously configure itself upon composition of rail vehicles, in particular of trains with a plurality of wagons. Advantageously, it can transmit data from a device 3 on a shaft of a wagon to an adjacent or at least spatially nearby device 3 on the shaft of another wagon. Thereby, great distances can be bridged, which otherwise could only be overcome by increasing the transmitting power of an individual device. Thereby, power can be saved. To this, the device 3 can provide the required protocols for authentication and authorization within an evolving network. In addition, the device is advantageously set to also provide the parameters additionally required for rail vehicles in addition to the conventional network characteristics. To this, for example data can be input into the device, which defines the membership to a train. Parameters can also be input, which relate to a wagon of a train. It can be linked to one or more IDs of the wagon or the shafts of wagons and permanently be stored. A device 3 can have a unique singular ID, which is linked to the shaft 2 of a rail vehicle. Thereby, characteristics of the shaft 2 can be monitored and examinations can be taken as a basis. Manipulation is only possible if the device is removed, which in turn can be prevented by lead sealing to the shaft of the vehicle axle, as above described.

The exchange of data can be effected wirelessly with different further devices 12, 14 as already described above with reference to FIG. 11. They can be provided as telematics unit 14 or else telematics units 14 on each wagon or outside of the train as handheld apparatuses 12 or else fixed apparatuses 12. The devices 12, 14 can then take over a portion of the evaluation of the signals or receive the complete data from the devices 2. The devices 3, 12, 14 can integrate themselves in an infrastructure, as it was described with reference to FIG. 11. In particular, the wagon sequence information can then also be advantageously utilized within the infrastructure.

According to a further embodiment of the invention, a device 3 is further configured to determine the natural resonant frequency of a shaft 2. In particular, it can include structure-borne sound sensors or other acoustic sensors to detect a shift of a natural resonant frequency of the shaft 2. Herein, preferably, the excitation of the shaft 2 caused by the operation is employed to determine the shift of the natural resonant frequency. In particular, the device 3 can be configured to analyze the shift of the natural resonant frequency with regard to possible errors or dangers. Here, the device 3 can include an evaluation unit detecting a defective shaft 2, in particular a crack formation of the shaft 2, based on the shift of the natural resonant frequency. In particular, such a detection of defects can be effected on each shaft of a rail vehicle. The evaluation can be communicated via the telematics and radio units or stored within the devices. Correspondingly, alarm signals can be triggered upon exceeding threshold values.

The device 3 according to the invention can further be configured to perform a damage analysis by means of evaluation of the modulation of the natural frequency of the shaft 2 with the rotational frequency of the shaft 2. Advantageously, separate excitation of the vibrations is not required. Instead, the evaluation is effected in the running operation. The excitation is then for example effected by bumps on the running surfaces and/or the rails. Furthermore, excitations can be induced in loading and unloading, in switching, by running over bumps and/or switches and they can be automatically analyzed for a shift of the natural frequency within the device 3 according to the invention. If the device 3 has acceleration sensors or structure-borne sound microphones, they can be configured to record such natural vibrations. The analysis of the vibration can directly be effected in the device 3, wherein a shift of the natural frequency can be detected there. A deviation from a set value of the natural frequency can be reported to a center via radio communication or stored within the device with indication of the identification of the device 3 or of the shaft 2 or of the wheel set or the wagon. It has become apparent that damages, for example arising on the shaft 2, can change the spectrum of the natural frequency of the shaft 2. By comparison to a set spectrum, thereby, it can early be warned of upcoming further damages and dangers resulting therefrom.

Furthermore, the shaft 2 generally is subject to bending stress. In particular, it arises by offset points of application of the load to be supported by the shaft 2, but also by the own weight of the shaft 2 itself. It has become apparent that the bending stress of the shaft 2 changes the natural frequency of the shaft 2. In a device 3 according to this embodiment of the invention, this effect can be exploited to for example determine the weight of the actual payload of a rail vehicle or of a freight wagon. The greater the weight of the payload is, the greater the bending stress in the shaft 2 and thus the shift of the natural frequency are. This in particular applies to an undamaged shaft. With a defective shaft (for example crack formation), a variation of the natural frequency spectrum can be determined besides the shift of the natural frequency. Thus, for example, with a rotating shaft 2, the natural frequency spectrum of the shaft 2 is modulated with the rotational frequency of the shaft 2. The inventive device 3 according to this embodiment can in particular advantageously be configured to detect this modulation of the natural frequency spectrum and exploit it for determining a defect on the shaft (for example crack formation).

The invention claimed is:

1. A device for monitoring a rail vehicle with wheels, comprising:
    an acceleration sensor suitable for determining a static acceleration along at least a first axis, wherein
    the acceleration sensor is disposed on a body rotating proportionally to the vehicle velocity in response to a traveling movement of the vehicle such that the acceleration sensor moves such that the proportion of the acceleration of gravity measured by the acceleration sensor varies due to an angular variation of the first axis with respect to the gravitational field of the earth, and
    an evaluation unit, which is set to receive an output signal of the acceleration sensor, the output signal representing the measured acceleration, the output signal permitting a determination of a mileage and at least one error state of the rail vehicle,
    the error state being at least one out of a bearing damage, a derailment or a blockage of the wheels which is determined based on the detection of a deviation from a sinusoidal course of the output signal
    wherein the device is configured to store and/or transmit the at least one error state and
    wherein the device is disposed on an outer circumference of a shaft of a vehicle axle coupled to one of the wheels and the device further comprises a unique number (ID), which is associated with the shaft.

2. The device according to claim 1, wherein the device includes a sensor, suitable for detecting a natural vibration of a shaft of a rail vehicle.

3. The device according to claim 2, wherein the device is further configured to analyze the detected natural vibration with respect to a deviation from a set value and thus to infer a damage to a shaft or a stress of a shaft.

4. The device according to claim 1, wherein the device includes a sensor suitable for detecting a natural vibration of the shaft of a rail vehicle.

5. A method for monitoring a rail vehicle comprising:
    measuring a static acceleration along at least a first axis, rotating a shaft of the vehicle in the gravitational field of the earth according to a rotation movement of the wheels of the vehicle such that the proportion of the measured static acceleration of gravity varies due to an angular variation of the first axis with respect to the gravitational field of the earth; and
    determining a mileage and at least one error state of the rail vehicle from monitoring progress of the measured acceleration,
    the error state being at least one out of a bearing damage, a derailment or a blockage of the wheels which is determined based on the detection of a deviation from a sinusoidal course of the output signal
    and storing and/or transmitting the at least one error state and associating a unique number to the shaft stored in a device coupled to the shaft.

6. A method for retrofitting a rail vehicle with wheels with a device for monitoring the traveling behavior of the rail vehicle, comprising:
    providing an evaluation unit;
    disposing an acceleration sensor to determine a static acceleration along at least one axis on a rotating body such that the acceleration sensor moves upon rotation movement of the wheels of the vehicle such that the proportion of the acceleration of gravity measured by the acceleration sensor varies due to an angular variation of the axis with respect to the gravitational field of the earth; and
    determining a mileage and at least one error state of the rail vehicle by the evaluation unit receiving an output signal of the acceleration sensor for indicating the acceleration measured by the acceleration sensor,
    the error state being at least one out of a bearing damage, a derailment or a blockage of the wheels which is determined based on the detection of a deviation from a sinusoidal course of the output signal
    and storing and/or transmitting the at least one error state, wherein the acceleration sensor and the evaluation unit are comprised in the device and wherein the device is disposed on an outer circumference of a shaft of a vehicle axle coupled to one of the wheels and the device further comprises a unique number (ID), which is associated with the shaft.

* * * * *